(12) United States Patent
Ou et al.

(10) Patent No.: US 10,509,559 B2
(45) Date of Patent: Dec. 17, 2019

(54) MICRO-PILLAR METHODS AND APPARATUS

(71) Applicant: Massachusetts Institute of Technology, Cambridge, MA (US)

(72) Inventors: Jifei Ou, Somerville, MA (US); Gershon Dublon, Cambridge, MA (US); Chin-Yi Cheng, Cambridge, MA (US); Liang Zhou, Riverside, CA (US); Hiroshi Ishii, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 589 days.

(21) Appl. No.: 15/147,629

(22) Filed: May 5, 2016

(65) Prior Publication Data
US 2016/0325505 A1   Nov. 10, 2016

Related U.S. Application Data

(60) Provisional application No. 62/157,414, filed on May 5, 2015.

(51) Int. Cl.
*B29C 64/386* (2017.01)
*B33Y 10/00* (2015.01)
(Continued)

(52) U.S. Cl.
CPC ........ *G06F 3/04883* (2013.01); *B29C 64/129* (2017.08); *B29C 64/386* (2017.08);
(Continued)

(58) Field of Classification Search
CPC ............. G06F 3/04883; B29C 67/0088; B29C 64/386
(Continued)

(56) References Cited

U.S. PATENT DOCUMENTS

| 5,979,892 A | 11/1999 | Smith |
| 7,009,752 B1 * | 3/2006 | Lorell .................. G02B 7/1821 |
| | | 359/198.1 |

(Continued)

FOREIGN PATENT DOCUMENTS

WO   WO-2013096730 A1 *   6/2013   ........... G03F 7/0002

OTHER PUBLICATIONS

Ink-jet printing of ceramic mirco-pillar arrays, Lejeune, M., Chartier, T., Dossou-Yovo, C., Noguera, R. Journal of the European Ceramic Society 29 (2009) 905-911. (Year: 2009).*

(Continued)

*Primary Examiner* — Joseph S Del Sole
*Assistant Examiner* — Russell E Sparks
(74) *Attorney, Agent, or Firm* — Stephen R. Otis

(57) ABSTRACT

A computer produces a digital model that efficiently describes a dense array of many micro-pillars. The digital model achieves this efficiency by describing an entire micro-pillar with only a few parameters. For example, an entire micro-pillar may be described by two of more of the following parameters: height, base thickness, profile and tilt. The computer outputs instructions to fabricate the micro-pillar array, in accordance with the digital model. A 3D printer fabricates the micro-pillar array, based on the instructions. Applying vibration to a directional array of micro-pillars may cause the array of micro-pillars to actuate motion of a passive object that is touching the array. Also, a sensor may measure sounds caused by swipes against a micro-pillar array, and output signals indicative of the measurements. A computer performs a machine learning algorithm that takes the measurements as an input, and classifies the swipes.

16 Claims, 16 Drawing Sheets

(51) Int. Cl.
- *B33Y 50/02* (2015.01)
- *G06F 3/0488* (2013.01)
- *B29C 64/129* (2017.01)
- *B33Y 30/00* (2015.01)
- *B33Y 80/00* (2015.01)

(52) U.S. Cl.
CPC ............... *B33Y 10/00* (2014.12); *B33Y 30/00* (2014.12); *B33Y 50/02* (2014.12); *B33Y 80/00* (2014.12)

(58) Field of Classification Search
USPC .......................................................... 264/308
See application file for complete search history.

(56) References Cited

U.S. PATENT DOCUMENTS

| | | | |
|---|---|---|---|
| 7,267,731 B2* | 9/2007 | Iwasaki | C23C 16/047 148/508 |
| 7,661,319 B2 | 2/2010 | Liu et al. | |
| 7,747,341 B2* | 6/2010 | Dubois | H05K 1/16 700/119 |
| 8,294,333 B2 | 10/2012 | Salomon et al. | |
| 8,556,799 B2 | 10/2013 | Iwasaki et al. | |
| 8,720,047 B2* | 5/2014 | Hulseman | B23H 1/06 264/224 |
| 8,778,666 B1 | 7/2014 | Chung et al. | |
| 2008/0022513 A1 | 1/2008 | Liu et al. | |
| 2010/0145511 A1 | 6/2010 | Popa et al. | |
| 2015/0352792 A1* | 12/2015 | Kanada | B29C 67/0088 700/98 |
| 2017/0139058 A1* | 5/2017 | Wimmers | G01T 1/202 |

OTHER PUBLICATIONS

Definition of Cartesian Coordinate, Merriam-Webster Dictionary, https://www.merriam-webster.com/dictionary/Cartesian%20coordinate (Year: 2019).*

Amato, L., et al., Fabrication of high-aspect ratio Su-8 micropillar arrays; published in Microelectronic Engineering, vol. 98, Oct. 2012, pp. 483-487, Special issue MNE 2011—Part II.

Desimone, A. et al., Crawling motility through the analysis of model locomotors: Two case studies; published in Eur. Phys. J. E. (2012) 35: 85.

Devaraj, H., et al., Bio-inspired flow sensor from printed PEDOT:PSS micro-hairs; published in Bioinspiration & Biomimetics, vol. 10, No. 1, Feb. 4, 2015, IOP Publishing Ltd.

Follmer, S., et al., inFORM: dynamic physical affordances and constraints through shape and object actuation; published in Proceedings of the 26th annual ACM symposium on User interface software and technology,UIST '13, pp. 417-426, ACM New York, NY, USA, 2013.

Harrison, C., et al., Scratch input: creating large, inexpensive, unpowered and mobile finger input surfaces; published in Proceedings of the 21st annual ACM symposium on User interface software and technology, UIST '08, pp. 205-208, ACM New York, NY, USA, 2008.

Hudson, S., Printing teddy bears: a technique for 3D printing of soft interactive objects; published in Proceedings of the SIGCHI Conference on Human Factors in Computing Systems , CHI '14, pp. 459-468, ACM New York, NY, USA, 2014.

Nowacka, D., et al., Touchbugs: actuated tangibles on multi-touch tables; published in Proceedings of the SIGCHI Conference on Human Factors in Computing Systems, CHI '13, pp. 759-762, ACM New York, NY, USA, 2013.

Ou, J., et al., jamSheets: thin interfaces with tunable stiffness enabled by layer jamming; published in Proceedings of the 8th International Conference on Tangible, Embedded and Embodied Interaction, TEI '14, pp. 65-72, ACM New York, NY, USA, 2013.

Paek, J., et al., Microsphere-assisted fabrication of high aspect-ratio elastomeric micropillars and waveguides; published in Nature Communications 5, Article 3324 doi:10.1038/ncomms4324, published Feb. 14, 2014.

Pangaro, G., et al., The actuated workbench: computer-controlled actuation in tabletop tangible interfaces; published in Proceedings of the 15th annual ACM symposium on User interface software and technology, UIST '02, pp. 181-190, ACM New York, NY, USA, 2002.

Perner-Wilson, H., et al., Making textile sensors from scratch; published in Proceedings of the fourth international conference on Tangible, embedded, and embodied interaction, TEI '10, pp. 349-352, ACM New York, NY, USA, 2010.

Rosner, D., et al., Reflections on craft: probing the creative process of everyday knitters; published in Proceedings of the seventh ACM conference on Creativity and cognition, C&C '09, pp. 195-204, ACM New York, NY, USA © 2009.

Sato, M., et al., Touché: enhancing touch interaction on humans, screens, liquids, and everyday objects; published in Proceedings of the SIGCHI Conference on Human Factors in Computing Systems, CHI '12, pp. 483-492, ACM New York, NY, USA, 2012.

Slyper, R., et al., Sensing through structure: designing soft silicone sensors; published in Proceedings of the fifth international conference on Tangible, embedded, and embodied interaction, TEI '11, pp. 213-220, ACM New York, NY, USA, 2011.

Weiss, M., et al., Madgets: actuating widgets on interactive tabletops; published in Proceedings of the 23nd annual ACM symposium on User interface software and technology, UIST '10, pp. 293-302 , ACM New York, NY, USA, 2010.

Yao, L., et al., PneUI: pneumatically actuated soft composite materials for shape changing interfaces; published in Proceedings of the 26th annual ACM symposium on User interface software and technology, UIST '13, pp. 13-22, ACM New York, NY, USA, 2013.

* cited by examiner

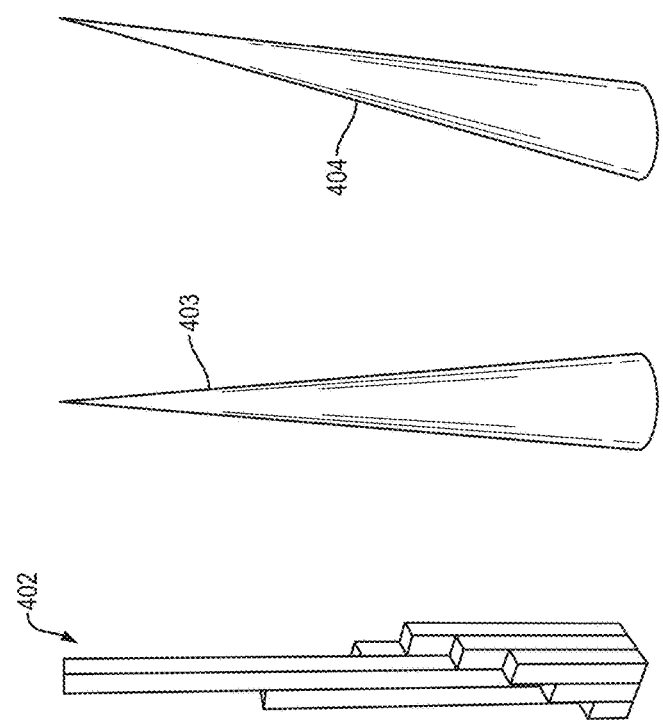
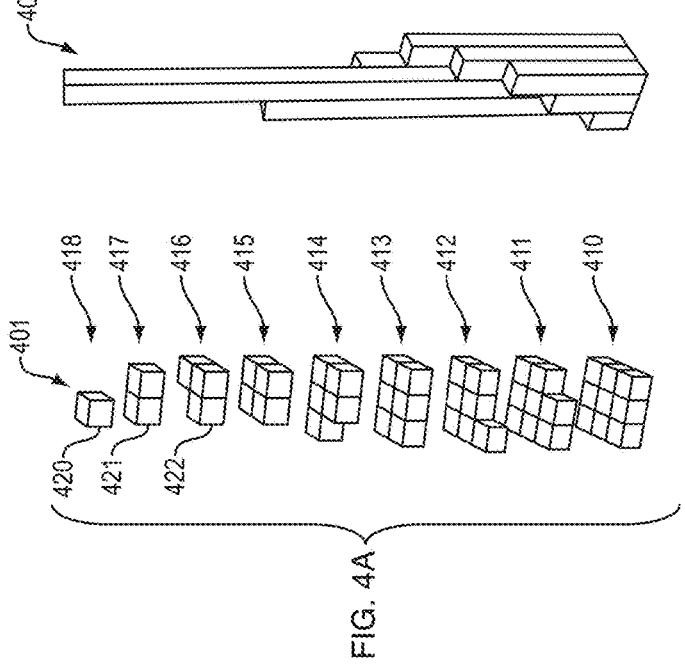
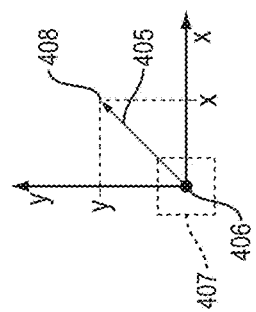

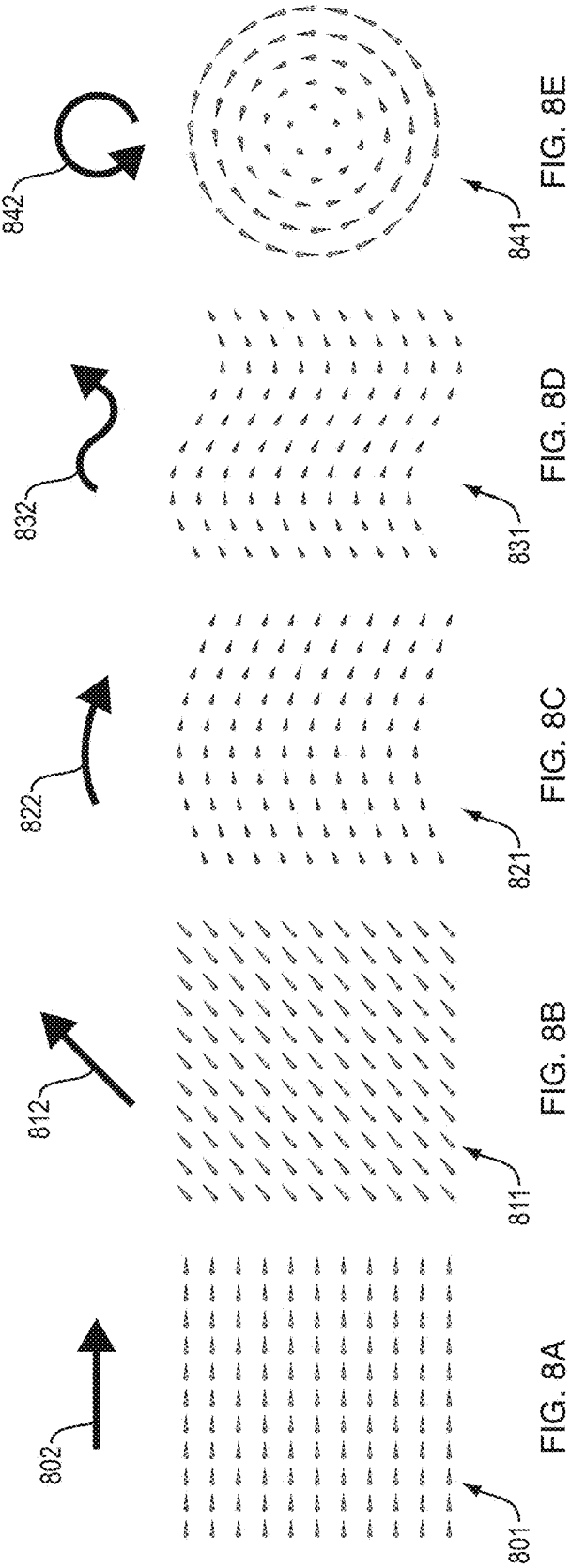

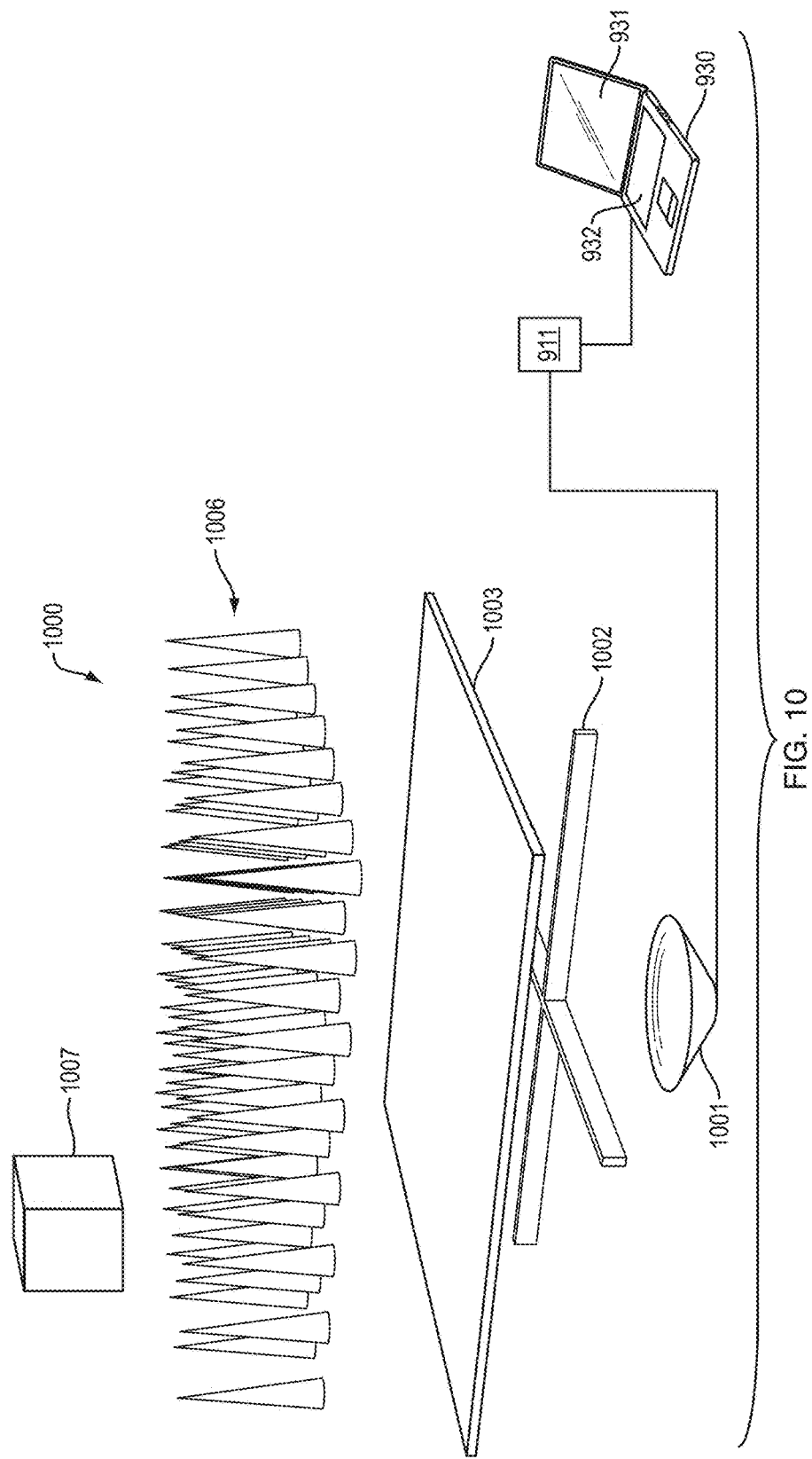

MICRO-PILLAR METHODS AND APPARATUS

RELATED APPLICATIONS

This application claims the benefit of U.S. Provisional Patent Application No. 62/157,414, filed May 5, 2015, the entire disclosure of which is herein incorporated by reference.

FIELD OF TECHNOLOGY

The present invention relates generally to micro-pillars.

SUMMARY

The inventors were confronted by a problem: It is difficult for a 3D printer to fabricate a dense array of more than a thousand micro-pillars in accordance with a conventional CAD model. This is because conventional CAD models do not efficiently represent an array of micro-pillars.

In illustrative implementations of this invention, this problem is solved as follows: a computer, with input from a user, produces a digital model that efficiently describes a dense array of many (more than a thousand) micro-pillars. The digital model achieves this efficiency by describing an entire micro-pillar with only a few (e.g., 2, 3, 4, 5 or 6) parameters, even though the entire micro-pillar may occupy tens, hundreds or thousands of pixels. These few parameters may encode the size, shape and orientation of an entire micro-pillar.

For example, in some implementations of this invention, an entire micro-pillar may be described by two of more of the following parameters: height, base thickness, profile and tilt.

Base thickness is the maximum dimension (width or length) of the base of the micro-pillar.

Profile is a description of taper of the micro-pillar. "Profile" of a micro-pillar means (i) speed of tapering of the micro-pillar, or (ii) acceleration of tapering of the micro-pillar. For purposes of this paragraph: (a) speed of tapering means the rate of change, per layer, in the number of pixels in respective layers of the micro-pillar; and (b) acceleration means the rate of change of the speed of tapering. For example, if, over a region of nine layers of the micro-pillar, the thickness of the micro-pillar reduces, from the bottom of the region to the top of the region, at a constant rate of one pixel per layer, such that the bottom layer consists of 9 pixels and the top layer consists of 1 pixel, then: (a) speed of tapering in that region is 1 pixel per layer; and (b) the acceleration of tapering in that region is zero.

In some implementations, each micro-pillar tapers. That is, in some cases, each micro-pillar is roughly similar to a cone, in that each micro-pillar is thicker at its base and becomes thinner until it reaches its tip, which is its thinnest layer. For example, the tip may consist of a single pixel.

In illustrative implementations, a digital model may describe tilt of a micro-pillar in many different ways. For example, the tilt of a micro-pillar may be described by an x coordinate that indicates the x-direction horizontal component of tilt, and by a y coordinate that indicates the y-direction horizontal component of tilt.

In some cases, profile and base thickness of micro-pillars in an array are constant, and each micro-pillar in the array is described by the height and tilt of the micro-pillar.

In some cases, the digital model specifies, for each respective micro-pillar in the array, tilt of the respective micro-pillar by specifying a first Cartesian coordinate and a second Cartesian coordinate. The first Cartesian coordinate (e.g., the x coordinate) specifies a first horizontal component (e.g., the x-axis horizontal component) of the tilt of the respective micro-pillar. Likewise, the second Cartesian coordinate (e.g., the y coordinate) specifies a second horizontal component (e.g., the y-axis horizontal component) of the tilt of the respective micro-pillar.

Furthermore, in some cases, the digital model comprises a RGB bitmap that assigns an R value, a G value and a B value to each respective micro-pillar in the array, such that: (a) the R, G and B values do not represent color information; and (b) out of the three R, G and B values for the respective micro-pillar (i) a first value specifies the first Cartesian coordinate, (ii) a second value specifies the second Cartesian coordinate; and (iii) a third value specifies height of the respective micro-pillar.

In some cases, the density of the micro-pillars in an array depends on the frequency with which the computer samples the bitmap. Thus, in some cases, the number of micro-pillars per unit area of the array that is actually fabricated depends on the number of times that the computer samples the bitmap per unit area of the array.

In illustrative implementations, a computer first generates an efficient digital model of a micro-pillar array, as described above. Then the computer outputs instructions to fabricate the micro-pillar array, in accordance with the digital model. A 3D printer fabricates the micro-pillar array, based on the instructions.

In illustrative implementations of this invention, each micro-pillar in the array has (a) a length that is greater than 100 micrometers and less than 50 millimeters; (b) a width that is greater than 50 micrometers and less than 1 millimeter; and (c) an aspect ratio that is greater than 2:1.

In some implementations of this invention, applying vibration to a directional array of micro-pillars causes the array to actuate motion of a passive object that is touching the array.

For example, when a vibration is applied to a directional array of micro-pillars that is attached to a flat surface, the vibration may cause a passive object that is touching the array to move. The direction of movement of the passive object is substantially the same as the direction of tilt of the micro-pillars in the array, if one considers only horizontal components of direction.

In some cases, vibrating a directional micro-pillar array attached to a curved surface actuates rotary or axial movement of a passive object that is touching the array.

In some cases, a computer controls the direction of actuated movement of a single passive object, by controlling the vibration frequency applied to different micro-pillar arrays. For instance, two different micro-pillar arrays may be embedded together—that is, positioned such that the two arrays touch each other or such that micro-pillars in the first array are spatially interspersed with micro-pillars in the second array. The two different micro-pillar arrays may have different resonant frequencies. The micro-pillars in the first array and the micro-pillars in the second array may be pointed in different directions. Thus, applying different vibration frequencies may cause the passive object to be moved in different directions.

In some cases, a computer controls actuated movement of two passive objects that have different masses, by controlling the vibration frequencies applied to two micro-pillar arrays. In many use scenarios: (a) the first passive object is actuated by vibrations in a first range of frequencies but not by vibrations in a second range of frequencies; (b) the second passive object (which has a different mass than the first object) is actuated by vibrations in the second range of frequencies but not by vibrations in the first range of frequencies; and (c) a computer controls which passive object is actuated, by controlling the vibration frequency applied to the two micro-pillar arrays.

In some implementations of this invention, an array of micro-pillars vibrates when an external object moves in a trajectory across the array while touching the array. A sensor takes measurements of the vibrations. The vibrations have a spectrum that depends, at any given point in the trajectory, on the orientation of the trajectory at the given point relative to the orientation of micro-pillars in the array. A computer performs a calculation that (a) takes data indicative of the measurements as an input, and (b) performs machine learning to classify the trajectory based on the spectrum.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 4A shows a pixel-by-pixel, layer-by-layer representation of a micro-pillar.

FIG. 4B shows an example of a micro-pillar that has been fabricated.

FIG. 4C shows an ideal shape of a cone.

FIG. 4D shows a tilted cone.

FIG. 4E shows Cartesian coordinates that specify horizontal components of tilt of a micro-pillar.

FIG. 8A, FIG. 8B, FIG. 8C, FIG. 8D, and FIG. 8E show (a) different patterns of micro-pillar orientations; and (b) different directions of movement that are actuated by these patterns of micro-pillar orientations.

FIGS. 9 and 10 each show an actuator that vibrates micro-pillars, in order to impart movement to a passive object that is touching the micro-pillars. In FIG. 9, the micro-pillars are attached to the curved wall of a cylindrical cavity. In FIG. 10, the micro-pillars are attached to a flat surface.

In FIG. 11A, a micro-pillar array is attached to a curved surface of a toy animal. In FIG. 11B, a micro-pillar array is attached to a flat surface.

The above Figures show some illustrative implementations of this invention, or provide information that relates to those implementations. However, this invention may be implemented in many other ways.

DETAILED DESCRIPTION

3D Printer Hardware

In illustrative implementations of this invention, a digital model efficiently represents an array of many micro-pillars. Based on this digital model, a computer controls a 3D printer that fabricates an array of micro-pillars.

With this efficient digital model, 3D printing of arrays of many (e.g., thousands) of micro-pillars becomes practical with a wide variety of 3D printer technologies. For example, either a DLP® (Digital Light Processing®) 3D printer or a laser-based stereolithography (SLA) printer may print the micro-pillars. These two approaches are shown in FIGS. 1 and 2, respectively.

More generally, in illustrative implementations, any type of 3D printer may fabricate the micro-pillars. For example, the 3D printer may comprise: (a) a photopolymerization 3D printer (e.g., DLP® or SLA printer); (b) an inkjet head 3D printer; (c) a direct metal laser sintering 3D printer, electron-beam melting 3D printer, selective laser melting 3D printer, selective heat sintering 3D printer, a plaster-based 3D printer, or any 3D printer for fusing or agglomerating granules; (d) an extrusion deposition (e.g., fused deposition modeling) 3D printer; (e) an electron beam freeform fabrication 3D printer; or (f) a lamination (e.g., laminated object manufacturing) 3D printer.

Figure 1:
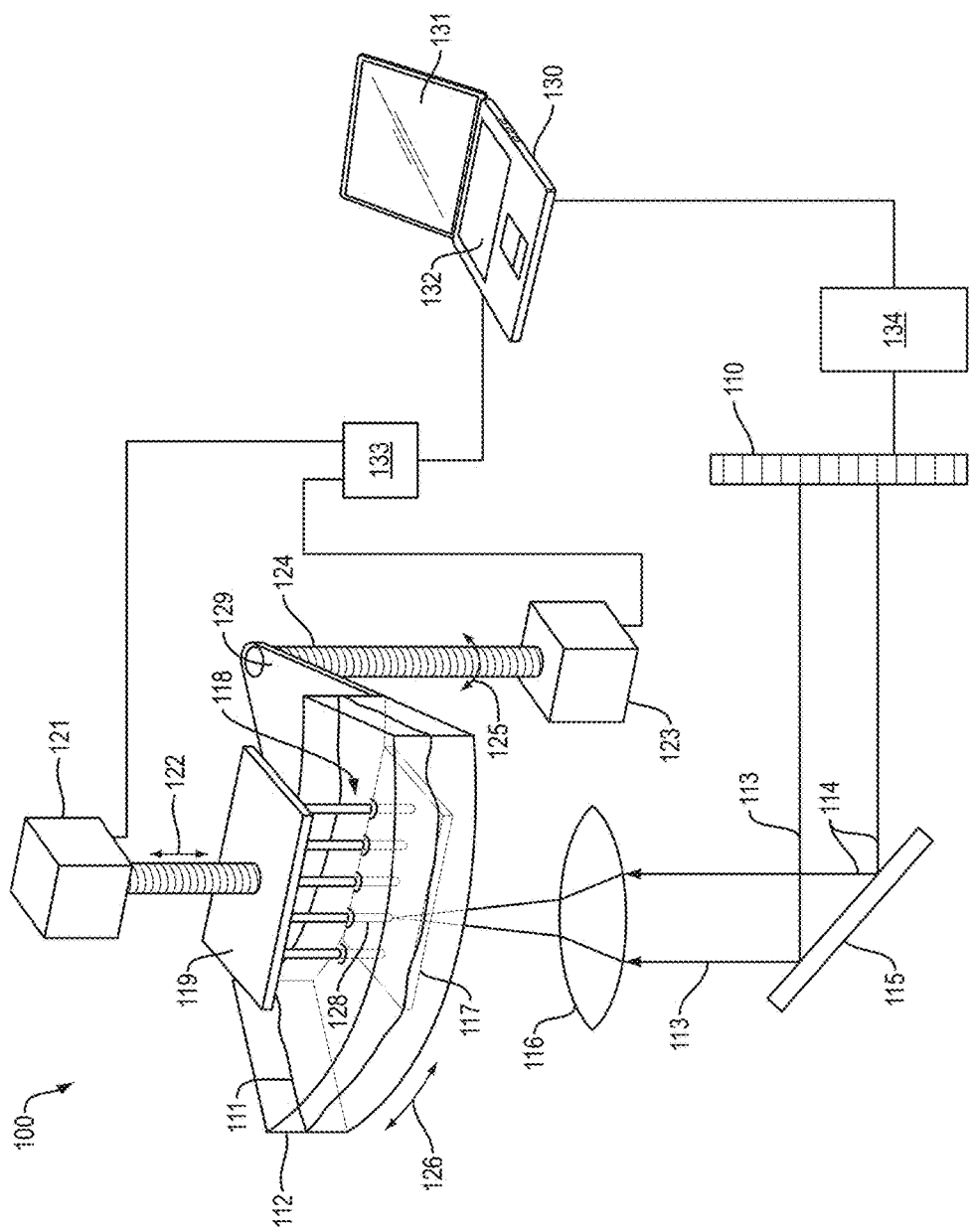
FIG. 1 shows a DMD (digital micromirror device) 3D printer fabricating micro-pillars.
Figure 2:
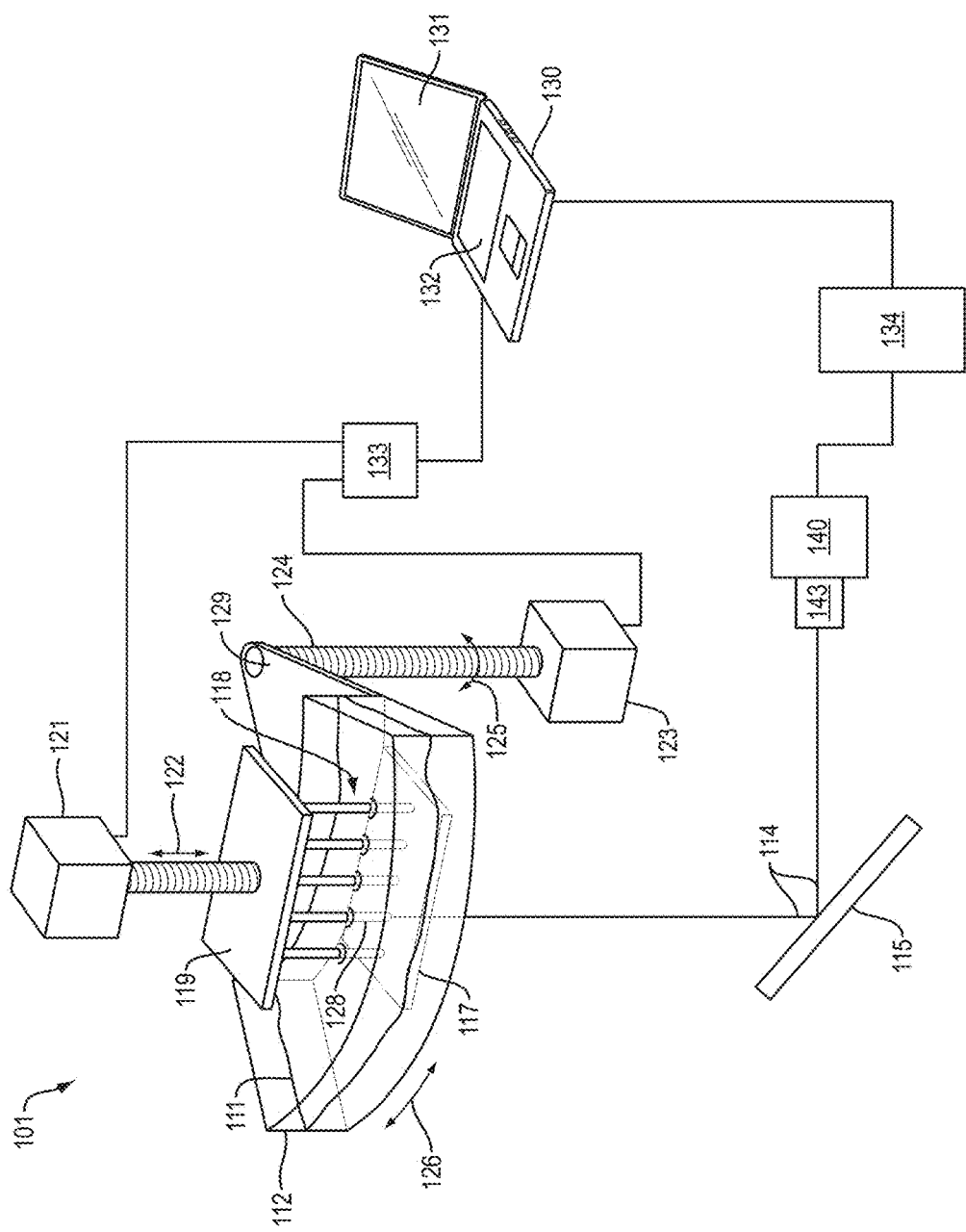
FIG. 2 shows a stereolithography 3D printer fabricating micro-pillars.

FIG. 1 shows a DMD (digital micromirror device) 3D printer 100 fabricating micro-pillars 118, in an illustrative implementation of this invention. In FIG. 1, a DMD 110 emits near-ultraviolet light (e.g., with peak intensity at a wavelength of 450 nm), including light rays 113, 114. The near-ultraviolet light cures liquid resin 111 layer-by-layer to form micro-pillars 118, including micro-pillar 128. The liquid resin 111 is a photopolymer. The near-UV light from DMD 110 is steered by a mirror 115, and then focused by a lens 116. The light passes through a transparent window 117 in the bottom of a resin tank 112. The window 117 comprises PDMS (polydimethylsiloxane), which is optically clear. The near-UV light causes liquid resin in certain regions to cure into a solid material. Rod 124 supports structural element 129, which in turn supports resin tank 112.

In the example shown in FIG. 1, each layer being printed is a layer of multiple micro-pillars. The resin cures adjacent to the PDMS window 117. After each layer is printed: (a) the DMD 110 turns off; (b) then a so-called peeling axis motor 123 rotates rod 124 back and forth in a sixty-degree arc, thereby causing the resin tank 112 to move back and forth in a sixty-degree arc, and (c) then a z-axis motor 121 moves build platform 119 upward (e.g., by 250 microns). The micro-pillars are attached to build platform 119, which does not rotate. Thus, rotating the resin tank 112 back and forth in a sixty-degree arc causes the newly solidified layer of the micro-pillars to separate from the PDMS window. Furthermore, since the micro-pillars are attached to the build platform 119, moving the build platform 119 up causes the micro-pillars to move up, making room for the next layer of the micro-pillars to be fabricated. In FIG. 1: (a) arrow 125 symbolizes rotation of rod 124; (b) arrow 126 symbolizes rotation of support structure 129 and of resin tank 112; and (c) arrow 122 symbolizes upward motion of the build platform 119.

In FIG. 1, microcontroller 133 controls and interfaces with the z-axis motor 121 and the peeling-axis motor 123. Likewise, in FIG. 1, microcontroller 134 controls and interfaces with DMD 110. A computer 130 controls microcontrollers 133, 134. Computer 130 controls and interfaces with microcontrollers 133, 134, and also with multiple I/O devices, such as keyboard 132 and a display screen 131 for displaying a graphical user interface.

FIG. 2 shows a stereolithography (SLA) 3D printer 101 fabricating micro-pillars, in an illustrative implementation of this invention. The structure and functionality of the 3D printer in FIG. 2 are similar to that in FIG. 1. However, in FIG. 2, laser 140 (instead of DMD 110 in FIG. 1) emits near-ultraviolet light (e.g., with peak intensity at a wavelength of 450 nm). The laser beam 114 of near-UV light is steered by mirror 115 to the resin tank 112. For each layer being printed, an optical scanner 143 scans laser beam 114 in different directions in order to cure different regions of the resin. For example, the optical scanner 143 may include a galvanometer-actuated mirror (not shown) that changes orientation, thereby causing changes in direction of laser beam 114.

In FIGS. 1 and 2, for ease of illustration, only five micro-pillars are shown. However, in actual practice, the number of micro-pillars would be much greater.

Digital Modeling and Fabrication of Micro-pillars

In illustrative implementations, an I/O device accepts input from a user. The input specifies the geometry of an individual micro-pillar, such as height, base thickness, profile and tilt, as well as properties of the micro-pillar array as a whole, such as density (number of micro-pillars per unit area) and location of the array.

In illustrative implementations, the digital model includes at least three types of parameters that control 3D fabrication of micro-pillars. The first type of parameters specify a single micro-pillar's geometry, such as height, base thickness, tilt and profile. The second type of parameters specify the geometry of an array of micro-pillars on a flat surface, such as varying single micro-pillar geometry across an array of micro-pillars attached to a flat surface. The third type of parameters specify the geometry an array of micro-pillars on a curved surface.

Figure 3A:
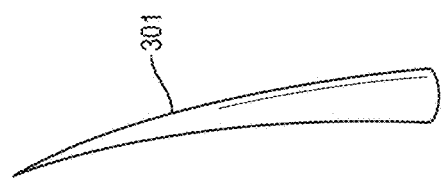
FIG. 3A shows a single micro-pillar.

FIG. 3A shows a single micro-pillar 301, in an illustrative implementation of this invention.

Figure 3B:
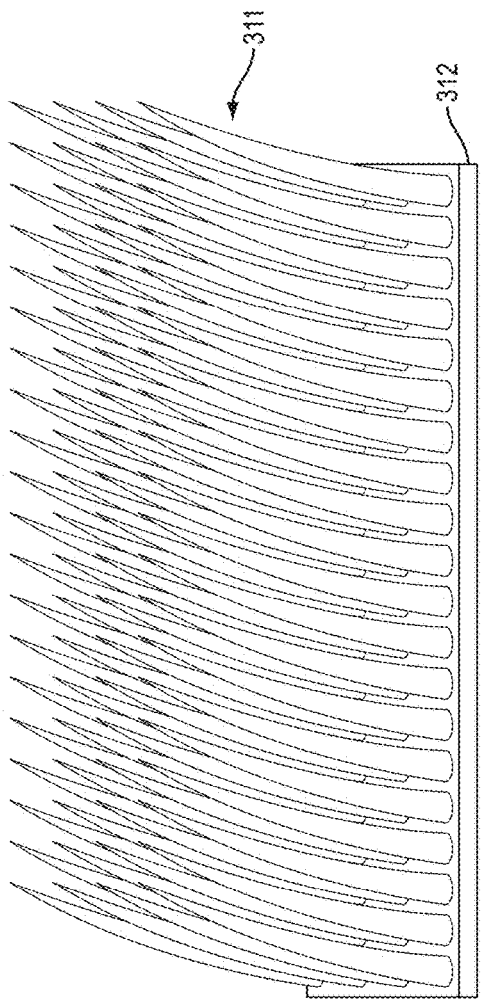
FIG. 3B shows an array of micro-pillars on a flat surface.

FIG. 3B shows an array of micro-pillars 311 attached to a flat surface 312, in an illustrative implementation of this invention.

Figure 3C:
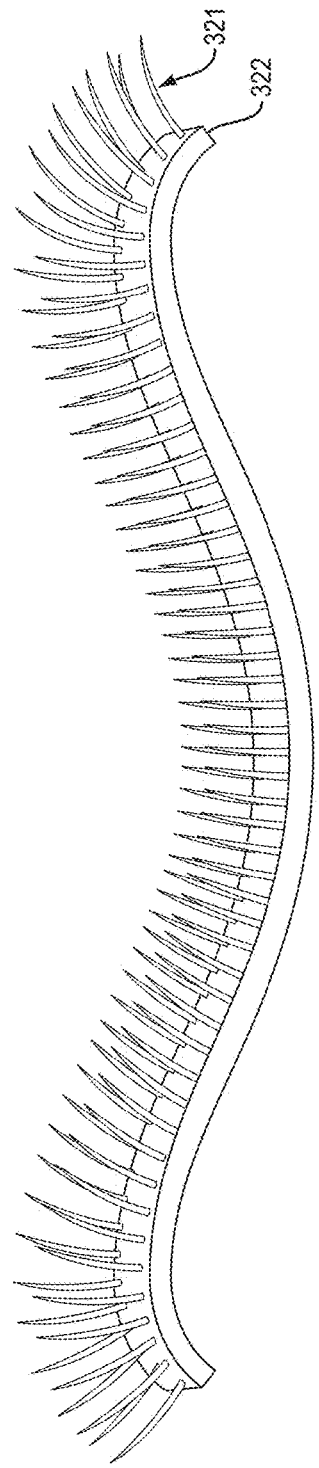
FIG. 3C shows an array of micro-pillars on a curved surface.

FIG. 3C shows an array of micro-pillars 321 attached to a curved surface 322, in an illustrative implementation of this invention.

A micro-pillar typically approximates, in overall shape, a high aspect ratio cone that is either a right circular cone (with its central axis completely vertical) or an oblique circular cone (with its central axis tilted at an angle that is less than 90 degrees from horizontal). The height, thickness and profile may vary from one micro-pillar to another. The diameter of an ideal cone continuously decreases from the base to the tip. However, the smallest unit of fabrication in a 3D printer is a pixel, and thus a fabricated micro-pillar only approximates an ideal cone.

In illustrative implementations of this invention, a digital model specifies a geometry of a micro-pillar that approximates the geometry of a cone. In illustrative implementations, the base of a micro-pillar is defined by an array of pixels (e.g. 3 by 3 pixels). The micro-pillar comprises a stack of multiple layers. In some cases, as the vertical height at which the layer is located increases, the pixels linearly reduce in a spiral stairs manner, leaving the top layer with just 1 pixel. This model provides high resolution control of the printed micro-pillar, in a shape that approximates a cone. The model may specify tapering velocity—that is, the rate at which the micro-pillar tapers from the base of the micro-pillar (where the micro-pillar is thickest) to the tip of the micro-pillar (where the micro-pillar is thinnest). For example, a micro-pillar may taper at the rate of one pixel per layer. In some cases, the tapering is not constant and instead accelerates. Thus, in some cases, the digital model may specify the rate of acceleration of the tapering.

In order to make a micro-pillar lean at a certain angle, the pixel group may be offset in an X or Y horizontal direction every few layers. For example, if the 3D printer has twice as much resolution in the z-axis (vertical axis) as in the horizontal (x- and y-) axes, then the relationship of the angle and layer is:

$$\tan \theta = (L/2) \times P$$

where L is the number of layers, and P is the numbers of offsetting pixels.

In some cases, a digital model of a micro-pillar may describe height, base thickness, and profile of a micro-pillar (a) in terms of pixels and pixel layers or (b) in terms of SI units, such as SI distances. For example, a digital model may describe as a micro-pillar as having a height of 25 pixels and having a base thickness of 10 pixels.

FIGS. 4A, 4B, 4C, 4D and 4E illustrate geometry of a single micro-pillar, in an illustrative implementation of this invention.

FIG. 4A shows a pixel-by-pixel, layer-by-layer representation of a micro-pillar. In FIG. 4A, each cube (e.g., 420, 421, 422) represents a pixel of a micro-pillar 401. The micro-pillar 401 consists of nine pixel layers (410, 411, 412, 413, 414, 415, 416, 417, 418). Thus the height of micro-pillar 401 is nine layers. The base layer 410 of micro-pillar 401 is a 3×3 pixels square. Thus the base thickness of micro-pillar 401 is three pixels. Micro-pillar 401 tapers (thins from base to tip) at a constant speed of one pixel per layer. Thus, the acceleration of micro-pillar 401 is zero pixels/(layer$^2$).

FIG. 4B shows the shape of a micro-pillar 402 that has been fabricated. The overall shape of the fabricated micro-pillar 402 roughly approximates a cone. In the example shown in FIG. 4B, the base is square, and thus the width and length of the base are equal. However, in some cases, the base is not a square.

FIG. 4C shows an ideal cone shape 403.

FIG. 4D shows a tilted cone 404.

FIG. 4E shows Cartesian coordinates that specify horizontal components of tilt of a micro-pillar. In FIG. 4E, the x-y plane is horizontal; and the tilt of the micro-pillar is the sum of the horizontal components of position vector 405. Vector 405 starts at location 406 in the base 407 of the micro-pillar and ends at location 408 in the tip of the micro-pillar. The x-coordinate of location 408 indicates the x-direction horizontal component of the tilt of the micro-pillar. The y-coordinate of location 408 indicates the y-direction horizontal component of the tilt of the micro-pillar.

In some cases: (a) location 408 is the orthogonal projection of a location in the tip of the micro-pillar, onto a horizontal plane; and (b) location 406 is a location that is in the base layer of the micro-pillar and lies in the same horizontal plane. For example, in some implementations, location 406 is: (a) the center pixel of the base of the micro-pillar; (b) the centroid of the base of the micro-pillar; or (c) a corner of the pixel in which the centroid of the base is located. Similarly, in some implementations, location 408 is the orthogonal projection, unto the same horizontal plane, of: (a) the center pixel of the tip of the micro-pillar; (b) the centroid of the tip of the micro-pillar; or (c) a corner of the pixel in which the centroid of the tip is located.

Figure 5A:
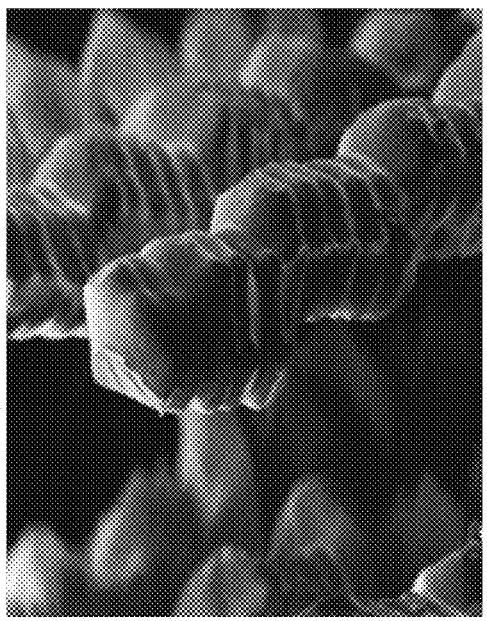
FIG. 5A and FIG. 5B are SEM (scanning electron microscope) photographs of micro-pillars.
Figure 5B:
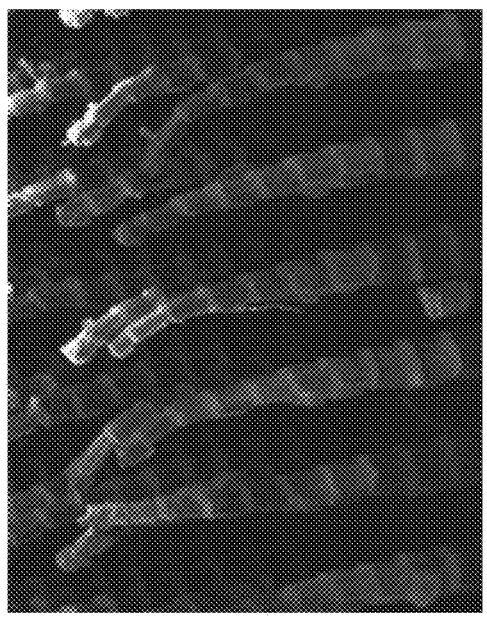

FIG. 5A and FIG. 5B are SEM (scanning electron microscope) photographs of micro-pillars, in an illustrative implementation of this invention. The micro-pillar in the center of FIG. 5A is offset horizontally approximately once every four or five layers. The tip of a micro-pillar is shown in the upper center of FIG. 5A. In FIG. 5B, an array of micro-pillars is shown. Each micro-pillar is thicker at the base (bottom) of the micro-pillar, and thinner at the top of the micro-pillar.

In illustrative implementations, a display screen (e.g., 131) displays a graphical user interface (GUI). A user may interact with the GUI to change the parameters of the micro-pillar geometry. In response to user input, the GUI provides a visual display of the micro-pillar structures that will result from the inputted geometry. Also, based on the user input, a computer generates bitmaps for printing.

In some cases, the digital model may specify a curved micro-pillar by offsetting the pixel group in a spiral layer by layer. A computer may, based on the 3D model, output instructions to cause a 3D printer to print a curved micro-pillar.

In illustrative implementations, a computer generates a digital model that specifies the geometry of many (e.g., hundreds or thousands) of micro-pillars across a flat surface.

For example, a computer may employ a color-mapping algorithm that maps data in a RGB bitmap, in order to specify geometry of an array of micro-pillars on a flat surface. The values of the R, G and B of each pixel correspond to a first parameter, second parameter and third parameter, respectively, each of which is parameter that specifies micro-pillar geometry. Thus, unlike a conventional color-map, the R, G and B values do not specify color information, but instead specify information about micro-pillar geometry.

In illustrative implementations of this invention, when performing the algorithm, a computer checks the bitmap every few pixels to create a new micro-pillar based on the pixel's color. In this algorithm, the density of the micro-pillar may be varied by changing how frequently the bitmap is checked.

In some implementations of this invention, height and tilt are the parameters of a single micro-pillar that vary most frequently. Thus, in some implementations, the RGB values in the bitmap do not map to colors or intensity of colors, but instead, in the bitmap: (a) the R-value maps to the angle between the X-axis and the tilt; (b) the G-value maps to the angle between the Y-axis and the tilt; and (c) the B-value maps to the height of the micro-pillar.

In other implementations of this invention, a single bitmap image encodes four, five, six or more parameters of micro-pillar geometry in a single bitmap image. For example, a single bitmap may encode parameters such as height, orientation (x and y coordinates), profile (e.g., velocity or acceleration of tapering) and base thickness.

In some implementations, a computer controls a 3D printer to print a micro-pillar array on an arbitrary curved surface.

In some cases, a hybrid digital model represents a micro-pillar array on a curved surface. In this hybrid approach, a computer creates a CAD model to represent the curved surface, and also generate bitmaps that encode pixels of the micro-pillar array. To do that, the computer performs an algorithm that includes the following steps: First, import the STL file and position it in the correct printing position. Second, find the centroid location of each triangle on the mesh and shoot a ray along the direction of the triangle's normal. Third, move a plane along the Z-axis to intersect with the mesh to create bitmaps of the CAD model, and intersect with the rays to draw pixels for the micro-pillar. By performing this algorithm, a computer may create bitmaps that contain both CAD model and micro-pillar array information. This algorithm controls micro-pillar geometry while slicing as well.

In this hybrid approach, the generated micro-pillar array may depend on the distribution and amount of the triangles. In many cases, it is desirable for the digital model to have a mesh that has dense and evenly distributed triangles.

In some implementations: (a) the 3D printer hardware allows up to 60 degrees of overhang, but not more; and (b) thus, the digital model ignores rays that are beyond that range.

In some implementations, if the surface to which the micro-pillar array is attached curves in toward itself, then a portion of a micro-pillar may penetrate the nearby surface, unless a corrective measure is taken. For example, a computer may shorten the height of particular micro-pillar in the digital model, so that when the particular micro-pillar is printed, it will not penetrate the nearby surface.

In some implementations, the set of parameters that are specified in the digital model includes one or more other parameters in addition to, or instead of, any one or more of the height, tilt, base thickness and profile of a micro-pillar. For example, the other parameters may include information regarding the vertical component of a vector that describes a micro-pillar (such as a position vector that starts at the base of the micro-pillar and ends at the tip of the micro-pillar), or any other information regarding a vector that describes the magnitude or orientation of a micro-pillar. Also, for example, the other parameters may include information about a micro-pillar array as a whole, including density (i.e., number of micro-pillars per unit area) and position or orientation of the array as a whole.

In illustrative implementations of this invention, a 3D printer fabricates an array of at least one thousand micro-pillars. Having at least one thousand micro-pillars in an array is advantageous for many reasons. For example, in many use scenarios, having at least one thousand micro-pillars in an array allows the array to produce a sufficiently large force to actuate movement of a passive object that is touching the array (as discussed below). If the number of micro-pillars were less, then the micro-pillars would not, in many use scenarios, produce a sufficiently large force to actuate the movement of the passive object. Also, for example, in many use scenarios, having at least one thousand micro-pillars in an array allows the array to produce a sound, when an object is rubbed against the array in a gesture, that has sufficient amplitude for the sound to be measured and for the gesture to be classified (as discussed below). If the number of micro-pillars were less, then the micro-pillars would not, in many use scenarios, produce a sufficiently loud noise for the noise to be measured with an acceptable signal-to-noise-ratio and classified.

Figure 6:
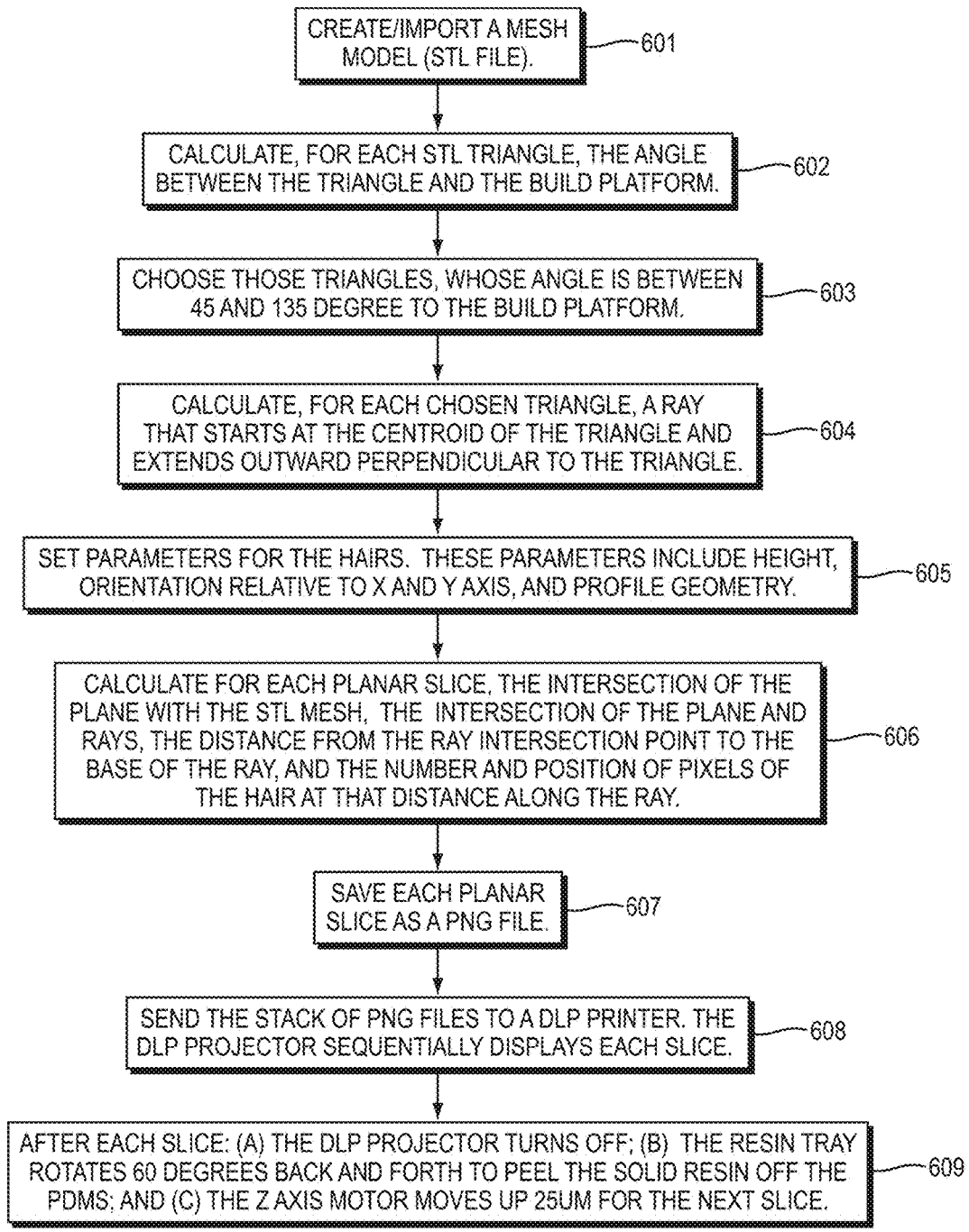
FIG. 6 is a flowchart of a method of (a) producing a digital model of an array of micro-pillars, and (b) fabricating the array of micro-pillars on a curved surface, in an illustrative implementation of this invention.

FIG. 6 is a flowchart of a method of (a) producing a digital model of an array of micro-pillars and (b) fabricating the array of micro-pillars on a curved surface, in an illustrative implementation of this invention. The method shown in FIG. 6 includes the following steps: Create/import a mesh model, as an STL file (Step 601). Calculate, for each STL triangle, the angle between the triangle and the build platform (Step 602). Choose those triangles, whose angle is between 45 and 135 degrees relative to the build platform (Step 603). Calculate, for each chosen triangle, a ray that starts at the centroid of the triangle and extends outward perpendicular to the triangle (Step 604). Set parameters for the micro-pillars. These parameters include height, orientation relative to x and y axis, and profile geometry (Step 605). Calculate for each planar slice, the intersection of the plane with the STL mesh, the intersection of the plane and rays, the distance from the ray intersection point to the base of the ray, and the number and position of pixels of the micro-pillar at that distance along the ray (Step 606). Save each planar slice as a PNG file (Step 607). Send the stack of PNG files to a DLP® 3D printer. The projector of the DLP® printer sequentially displays light patterns for the slices, causing each slice to be printed by curing resin in the resin tank (Step 608). After each slice: (a) the DLP® projector turns off; (b) the resin tray rotates 60 degrees back and forth to peel the solid resin off the PDMS, and (c) the z axis motor moves up 25 um for the next slice (Step 609).

In Step 603, triangles at certain angles are disregarded, because the 3D printer does not print structures with an overhang of more than a particular 60 degrees.

This invention is not limited to STL files. For example, in some implementations, a computer may generate a digital model of an array of micro-pillars, which model stores data in an .obj, .dxf, 0.3 dm, or .ply file format.

There are at least three advantages of generating bitmaps of micro-pillar structures, as described above: First, a computer may employ the bitmap to control a single micro-pillar's geometry (such as height, base thickness, and angle of the micro-pillar), with high precision (e.g., with precision of 50 um). Second, a computer may employ the bitmap to print a high-density micro-pillar array. For example, a prototype of this invention successfully printed 20,000 micro-pillars on a 30 by 60 mm flat surface. Third, a micro-pillar array may "grow" on any arbitrary CAD model while the model is being sliced.

In illustrative implementations, this invention has many practical applications, including: (a) 3D printing micro-pillars on curved surfaces, including toys with curved surfaces; (b) varying the thickness of the micro-pillar to control its stiffness; (c) 3D printing of objects with customized texture; and (d) two panels with dense micro-pillars may stick to each other when their micro-pillars are pressed together. This adhesion is apparently due to the large amount of contact surface on the micro-pillar that creates friction. As the angle at which the micro-pillar leans increases, the adhesion force may raise as well.

The examples in this "Digital Modeling and Fabrication of Micro-pillars" are non-limiting. For instance, the examples that describe a particular number of pixels are non-limiting examples that are provided for the sake of explanation. Also, for instance, any given parameter (e.g., height, base thickness, profile and tilt) may be expressed in many other ways.

Actuation by Vibrating Micro-pillars

In some implementations of this invention, applying vibration to a directional array of micro-pillars causes the array of micro-pillars to actuate motion of a passive object that is touching the array.

A directional micro-pillar array creates anisotropic friction for an object moving over the array.

In illustrative implementations, when a vibration is applied to the directional array of micro-pillars that is attached to a flat surface, the vibration and the anisotropic friction cause a passive object that is touching the micro-pillars to move. The direction of the movement is substantially the same as the direction of tilt of the micro-pillars in the array, if one considers only horizontal components of direction. Specifically, in some cases, the direction of the sum of the horizontal components of this movement is substantially the same as the direction of the tilt. For purposes of this paragraph, "horizontal" means parallel to the flat surface.

Thus, in some cases, the direction of tilt of the micro-pillars controls the direction of movement of the passive object.

In some cases, the passive object is pressed against the array of micro-pillars. For example, the passive object may be on top of the micro-pillar array, and may be pressed against the array by the force of gravity. Or, for example, a cylindrical passive object may be positioned inside a larger cylinder that is lined by an array of micro-pillars, such that the passive object is pressed against the micro-pillar array.

Vibrating a micro-pillar that is in contact with the passive object causes the micro-pillar to stick and slip relative to the passive object, thereby actuating movement of the passive object.

FIG. 7A, FIG. 7B, FIG. 7C, FIG. 7D and FIG. 7E show steps in a cycle of slip-stick motion, in an illustrative implementation of this invention. The slip-stick motion causes a passive object 703 to move.

Figure 7A:
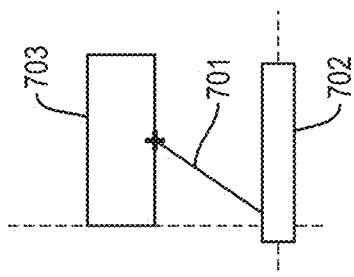
FIG. 7A, FIG. 7B, FIG. 7C, FIG. 7D and FIG. 7E show steps in a cycle of slip-stick motion.
Figure 7B:
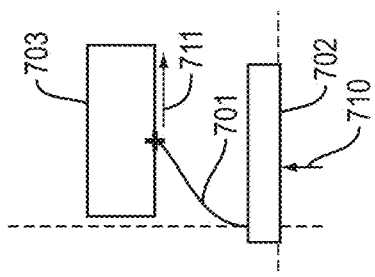
Figure 7C:
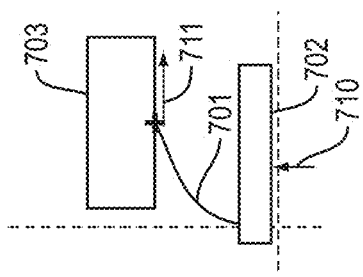
Figure 7D:
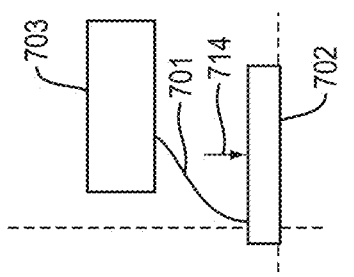
Figure 7E:
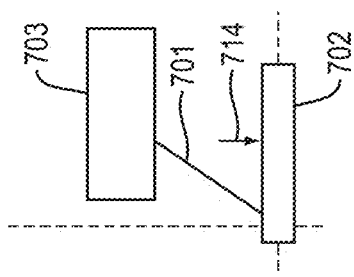

FIG. 7A shows the starting position of the cycle. Micro-pillar 701 is attached to a surface 702 and is touching passive object 703, which is on top of, and supported by, micro-pillar 701 and other micro-pillars (not shown). In FIGS. 7B and 7C: (a) a vibration causes surface 702 to move upward; (b) the tip of micro-pillar 701 is "stuck" relative to a point on the passive object 703, and thus (c) the upward motion of surface 702 causes the micro-pillar 701 to bend in such a manner that the micro-pillar 701 pushes the passive object 703 forward. The upward motion is symbolized by arrow 710 and the forward motion is symbolized by arrow 711. In FIGS. 7D and 7E: (a) a vibration causes the surface 702 to move downward; and (b) the tip of micro-pillar 701 slips relative to the passive object 703. The downward motion is symbolized by arrow 714.

In illustrative implementations, different orientations of micro-pillars cause a passive object resting on the micro-pillars to move in different directions.

FIGS. 8A to 8E show (a) different patterns of micro-pillar orientations; and (b) different directions of movement that are actuated by these patterns of micro-pillar orientation, in illustrative implementations of this invention.

FIGS. 8A to 8E each show a top view of a micro-pillar array that is attached to a flat, horizontal surface.

In FIG. 8A, the micro-pillars are oriented with their tips pointing to the right. Vibrating the micro-pillar array 801 causes a passive object that is touching the micro-pillar array 801 to move toward the right 802.

In FIG. 8B, the micro-pillars are oriented with their tips pointing to the upper right. Vibrating the micro-pillar array 811 causes a passive object that is touching the micro-pillar array 811 to move toward the upper right 812.

In FIG. 8C, the micro-pillars are oriented in a curved pattern, in which the slope of the orientation changes from positive to zero to negative as one moves from left to right in the micro-pillar array. Vibrating the micro-pillar array 821 causes a passive object that is touching the micro-pillar array 821 to move in a curve 822 with the same shape.

In FIG. 8D, the micro-pillars in array 831 are oriented in a sinusoidal curved pattern, in which the slope of the orientation changes from positive to zero to negative to zero to positive as one moves from left to right in the array 831. Vibrating the micro-pillar array 831 causes a passive object that is touching the micro-pillar array 831 to move in a sinusoidal curve 832 with the same shape.

In FIG. 8E, the micro-pillars are oriented in concentric circles. Vibrating the micro-pillar array 841 causes a passive object that is touching the micro-pillar array 841 to move in a circle 842.

In illustrative implementations, actuation of a passive object by a vibrating micro-pillar array is not limited to flat surfaces. In illustrative implementations, vibrating a directional micro-pillar array that is attached to a curved surface may actuate movement of a passive object that is touching the micro-pillar array.

Figure 8F:
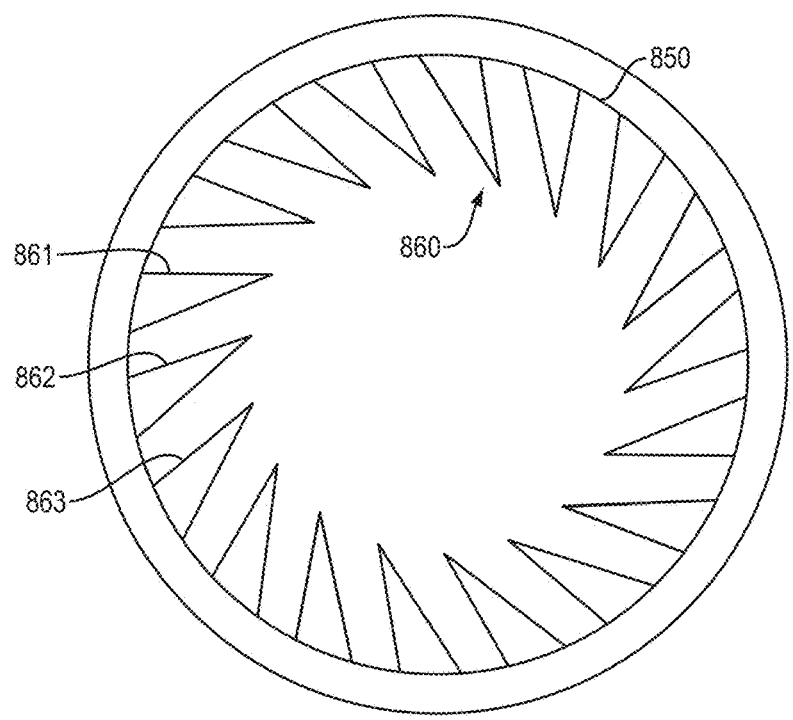
FIGS. 8F and 8G show a micro-pillar array that is attached to the wall of a cylindrical cavity.
Figure 8G:
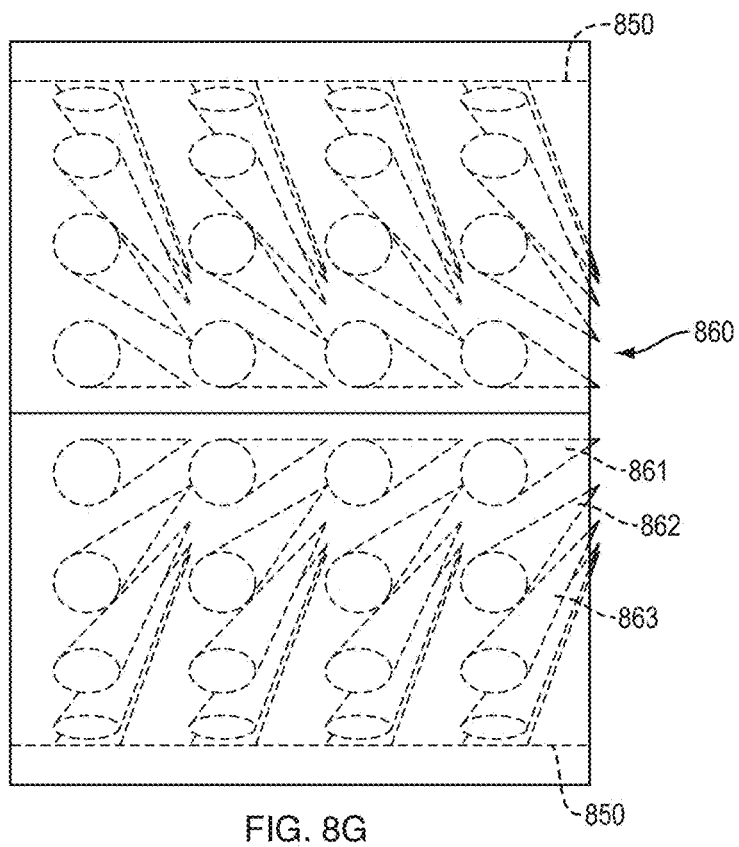

FIGS. 8F and 8G show a micro-pillar array that is attached to the wall 850 of a cylindrical cavity. FIG. 8F shows a front view looking into an open end of the cylindrical cavity. A micro-pillar array 860 is attached to the wall 850 of the cylindrical cavity. The micro-pillar array 860 comprises many micro-pillars (e.g., 861, 862, 863). FIG. 8G shows a side view of the cavity, looking through wall 850.

Figure 9:
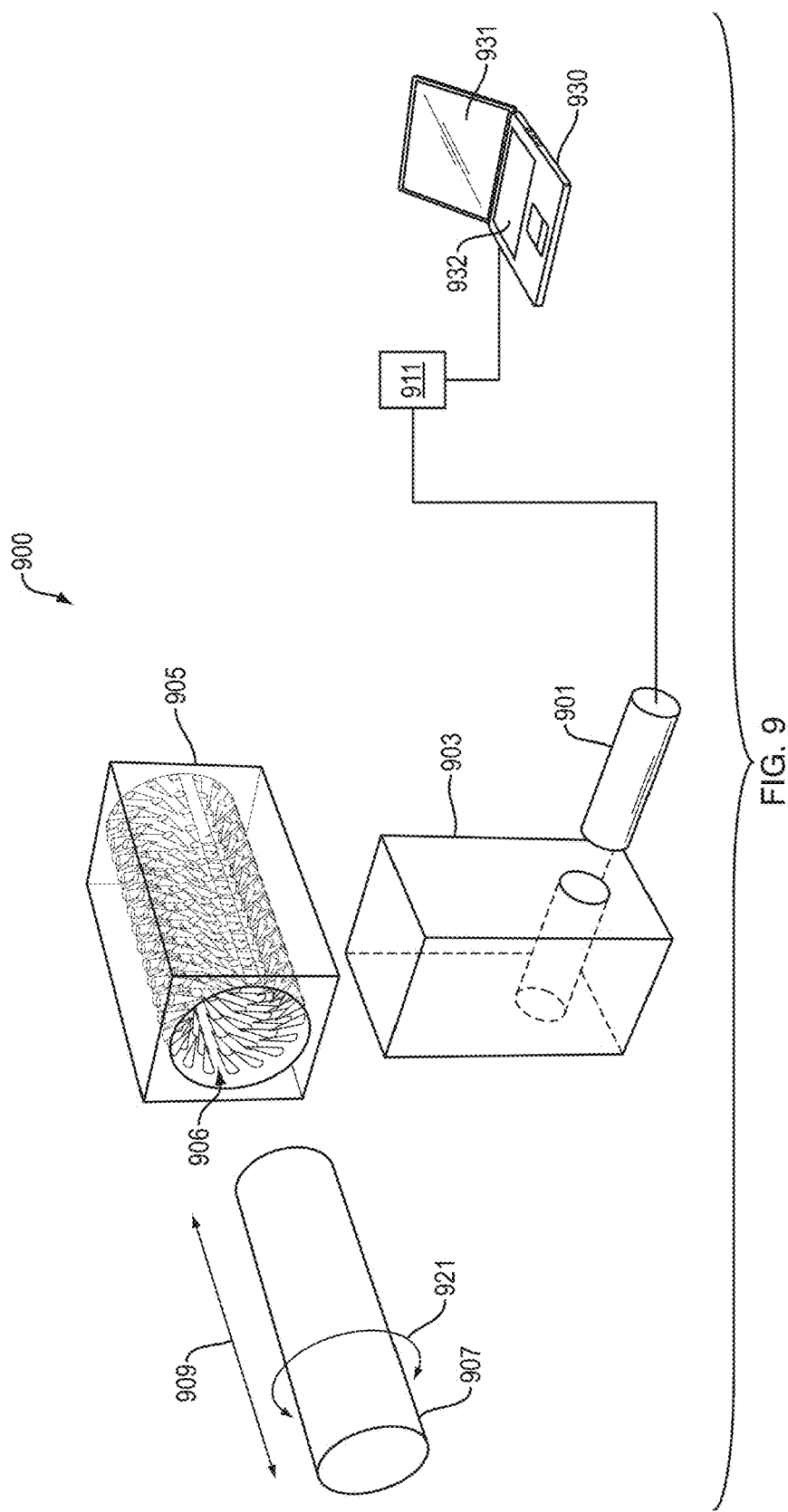

FIGS. 9 and 10 each show an actuator that vibrates micro-pillars, in order to impart movement to a passive object that is touching the micro-pillars. In FIG. 9, the micro-pillars are attached to the curved surface of a cylindrical cavity. In FIG. 10, the micro-pillars are attached to a flat surface.

In some cases, vibrating a micro-pillar array attached to a curved surface actuates rotary movement or axial movement (or both) of a passive object that is touching the micro-pillar array. For example, FIG. 9 shows an exploded view of an actuator 900 for actuating rotary or axial movement of a passive object. In FIG. 9, a motor 901 creates vibrations that are transmitted through a solid beam 903 to a component 905 that is pierced by a cylindrical cavity. A micro-pillar array 906 is attached to the wall of the cylindrical cavity. A cylindrical passive object 907 fits inside the cylindrical cavity. The vibrations from the motor 901 cause the micro-pillar array 906 to vibrate, which in turn may cause either rotary motion of the object 907, axial motion of the object 907, or both rotary and axial motion of the object 907. The rotary motion is symbolized by arrow 921 in FIG. 9, and comprises rotation about the longitudinal axis of passive object 901. The axial motion is symbolized by arrow 909 in FIG. 9, and comprises movement along the longitudinal axis of passive object 901. A microcontroller 911 controls the motor 901. The microcontroller 911 is controlled by computer 930. Computer 930 controls and interfaces with a computer screen 931 which displays a graphical user interface. A user may provide input via one or more I/O devices, such as keyboard 932.

In some cases, vibrating a micro-pillar array attached to a flat surface actuates movement of a passive object that is touching the micro-pillar array. For example, FIG. 10 shows an exploded view of an actuator 1000 for actuating horizontal movement of a passive object. (For purposes of the preceding sentence, "horizontal" means parallel to the flat surface). In FIG. 10, a speaker 1001 creates vibrations that are transmitted through a support structure 1002 and a solid platform 1003 to an array of micro-pillars 1006 that is attached to platform 1003. A passive object 1007 is on top of, and supported by, micro-pillar array 1006. The vibrations from the speaker 1001 cause the micro-pillar array 1006 to vibrate, which in turn causes movement of passive object 1007. A microcontroller 911 controls the speaker 1001. The microcontroller 911 is controlled by computer 930. Computer 930 controls and interfaces with a computer screen 931 which displays a graphical user interface. A user may provide input via one or more I/O devices, such as keyboard 932.

Note that FIGS. 9 and 10 show exploded views. Because of the exploded view, objects that are actually touching each other do not appear, in FIGS. 9 and 10, to be touching each other.

In some cases, the speed of the passive object depends on the geometry of the micro-pillar, the stiffness of material comprising the micro-pillar, and the weight of the passive moving object, as well as the vibration frequency and amplitude. In some cases, velocities increase as the vibration amplitude rises. However, the relation between the vibration frequency and the velocity of the passive moving object is not linear.

Using a micro-pillar array to actuate movement of a passive object has many practical applications, including at least the following:

A smartphone may vibrate, causing a micro-pillar array to vibrate, and thereby cause a passive object to move. For example, vibrations from a smartphone, transmitted through a micro-pillar array: (a) may cause an object (such as a toy or windspeed indicator) to rotate, or (b) may cause an object (e.g., such as a toy) to move in a precise path.

In some implementations, an actuation system includes two micro-pillar arrays with different micro-pillar orientations that are embedded in the same area. They also have two different geometries (thickness or tilt), and two different resonant frequencies. As a result, in some implementations, the actuation system actuates objects to move in different directions under different frequencies.

For example, in some cases: (a) an actuator system includes a motor for producing vibrations that are transmitted to a first micro-pillar array and to a second micro-pillar array; (b) the first array is attached to a flat surface and the second array is also attached to the flat surface; (c) the first and second arrays are positioned such that (i) micro-pillars in the first array are tilted in a first direction, and (ii) micro-pillars in the second array are tilted in a second direction, the first and second directions not being parallel to each other; (d) a first resonant frequency is the resonant frequency of micro-pillars in the first array and a second resonant frequency is the resonant frequency of micro-pillars in the second array; (e) the first and second resonant frequencies are different from each other; (f) the motor is configured to produce, at some times, vibrations that have maximum amplitude at the first resonant frequency and that actuate a first movement of an object touching the first and second arrays; (g) the motor is configured to produce, at other times, vibrations that have maximum amplitude at the second resonant frequency and that actuate a second movement of the object touching the first and second arrays; (h) the horizontal vector (as defined herein) of the first movement is in substantially the same direction as the tilt of micro-pillars in the first array; and (i) the horizontal vector of the second movement is in substantially the same direction as the tilt of micro-pillars in the second array.

The inventors discovered that objects with a certain weight are actuated by a specific range of vibration frequencies of the micro-pillar array. In some implementations, an actuation system sorts objects with different weight by applying different vibration frequencies.

For example, in some cases: (a) an actuator system includes a motor for producing vibrations that are transmitted to a first micro-pillar array and a second micro-pillar array; (b) a first resonant frequency is the resonant frequency of micro-pillars in the first array and a second resonant frequency is the resonant frequency of micro-pillars in the second array; (c) the first and second resonant frequencies are different from each other; and (d) the motor is configured to produce, at some times, a first set of vibrations that have maximum amplitude at the first resonant frequency, and to produce, at other times, a second set of vibrations that have maximum amplitude at the second resonant frequency, such that (i) the first set of vibrations actuate movement of a first object that is touching the first and second arrays, (ii) the second set of vibrations actuate movement of a second object that is touching the first and second arrays, the mass of the first object being different than the mass of the second object, (iii) speed of the first object, relative to the first array, is greater during the first set of vibrations than during the second set of vibrations, and (iv) speed of the second object, relative to the second array, is greater during the second set of vibrations than during the first set of vibrations.

Furthermore, in some cases, micro-pillar stiffness affects the speed of actuated movement or sorting.

Sensing by Micro-Pillars

In illustrative implementations, swiping a micro-pillar array—that is, moving an object across a micro-pillar array while touching the array—causes the array to vibrate and to make a sound. If the micro-pillar is leaning (e.g., at an acute angle relative to a flat surface), the sound made by swiping along the orientation of the micro-pillars is different than the sound made when swiping against the orientation of the micro-pillars.

In illustrative implementations of this invention, a sensor (e.g., a microphone) takes measurements of sounds caused by swiping a micro-pillar array, and outputs signals that encode the measurements. A computer performs a machine learning algorithm that, based on these measurements, classifies swipes of micro-pillar arrays.

Figure 11A:
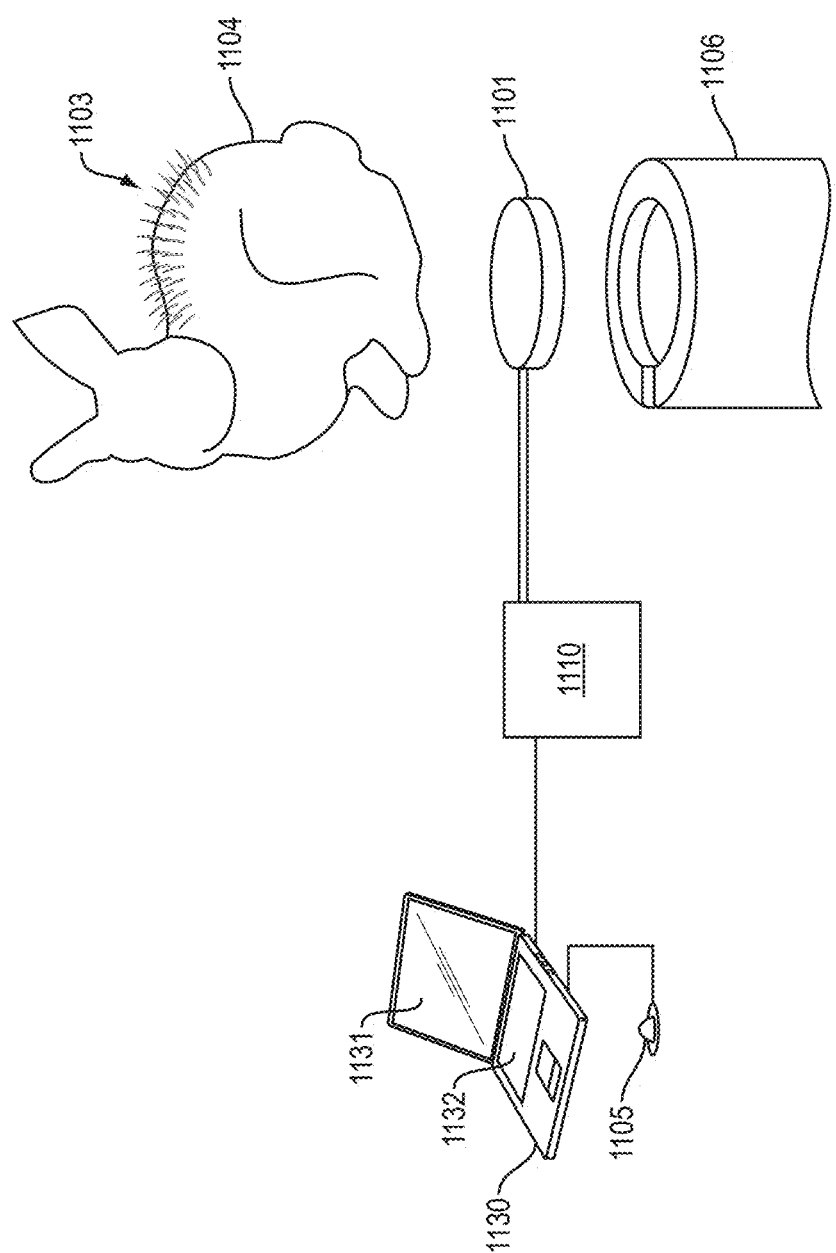
FIGS. 11A and 11B each show a sensor that detects vibrations imparted to micro-pillars by a moving object that is touching the micro-pillars.
Figure 11B:
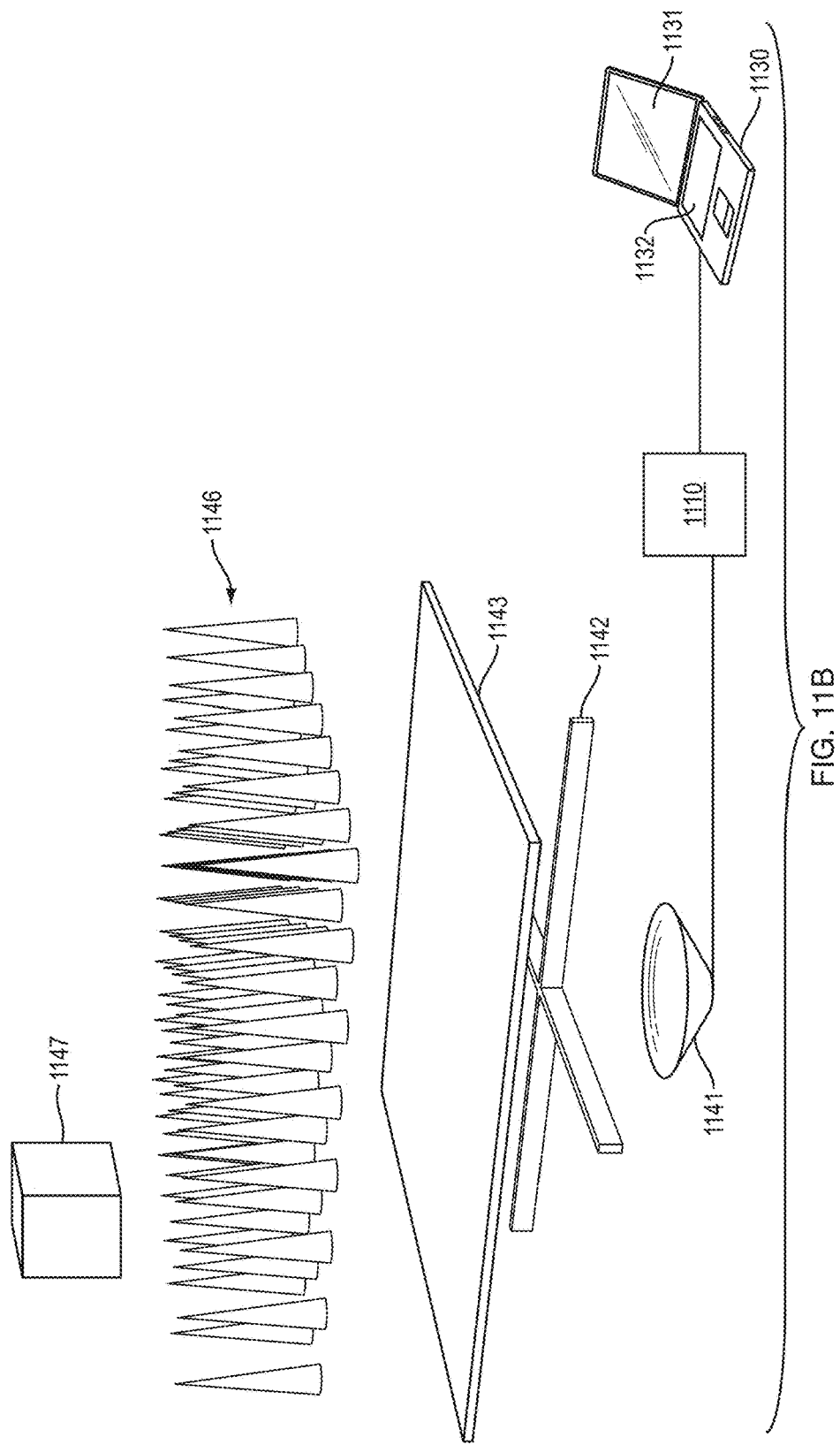

FIGS. 11A and 11B each show a sensor that detects vibrations imparted to micro-pillars by a moving object that is touching the micro-pillars, in illustrative implementations of this invention.

In FIG. 11A, a micro-pillar array 1103 is attached to a curved surface of a toy animal 1104. Swiping the micro-pillar array 1103 creates vibrations. These vibrations are transmitted to a microphone 1101 that detects the vibrations. The microphone 1101 is on top of, and supported by, a stand 1106. A JFET buffer 1110 conditions the analog electric signal from the microphone 1101. A computer 1130 digitizes the signal, classifies the swipe, and causes an I/O device (e.g., LED array 1105) to emit different colors, depending on the classification of the swipe. For example: (a) if the computer 1130 classifies the swipe as being in the same horizontal direction as the tilt of the micro-pillars, the computer 1130 may cause LED array 1105 to emit green light; and (b) if the computer 1130 classifies the swipe as being in the opposite horizontal direction as the tilt of the micro-pillars, the computer 1130 may cause LED array 1105 to emit red light. Alternatively, the toy animal 1104 may be semi-transparent and the LED array may be positioned inside the toy animal 1104, such that the toy animal glows and the color (e.g., green and red) emitted by the toy animal depends on the classification of the swipe.

In FIG. 11B, a micro-pillar array 1146 is attached to a flat surface 1143. Swiping the micro-pillar array 1146 with object 1147 creates vibrations. These vibrations are transmitted through the flat surface 1143 and then through a support structure 1142 to a microphone 1141 that detects the vibrations. A JFET buffer 1110 conditions the analog electric signal from the microphone 1141. A computer 1130 digitizes the signal, and classifies the swipe.

In FIGS. 11A and 11B, the computer 1130 (a) interfaces with and controls a display screen 1131 that displays a graphical user interface, and (b) interfaces with an I/O device, such as a keyboard 1132.

Figure 12:
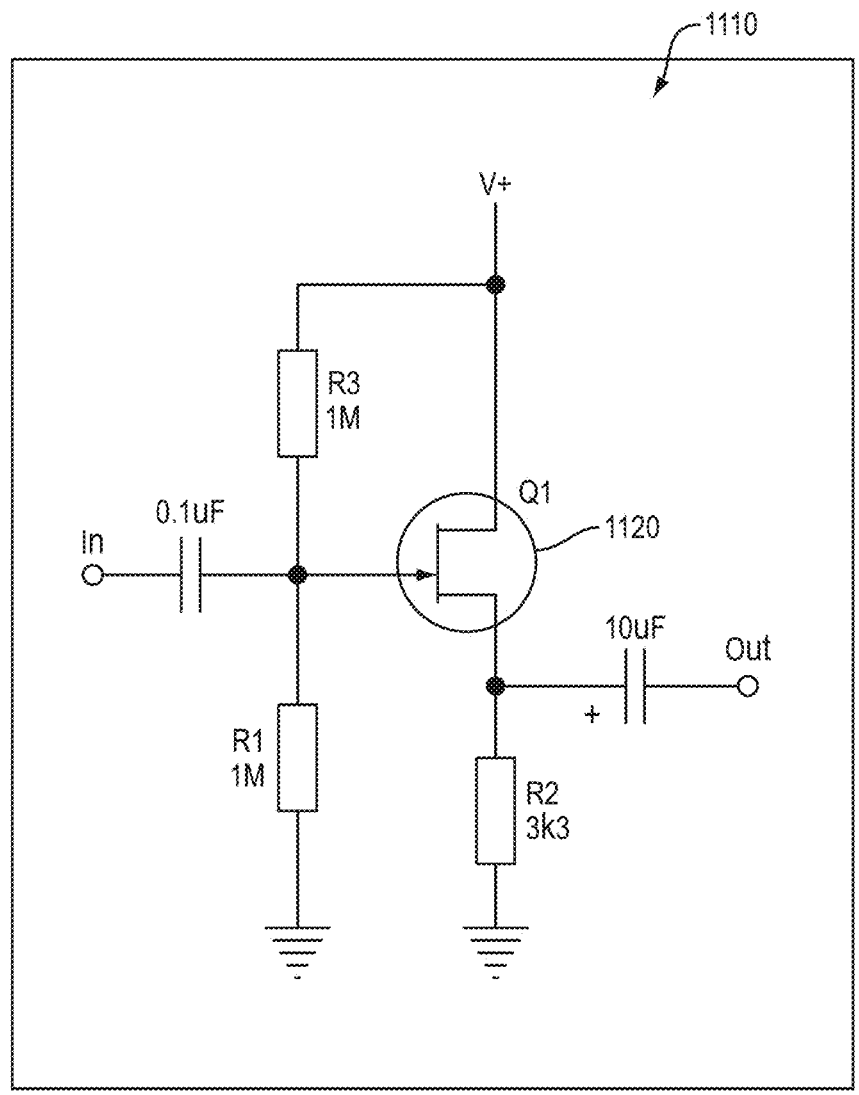
FIG. 12 is a schematic diagram of a JFET buffer.

FIG. 12 is a schematic diagram of a JFET buffer 1110 that is a component in the sensing systems shown in FIGS. 11A and 11B, in illustrative implementations of this invention. The JFET includes a transistor 1120

Figure 13A:
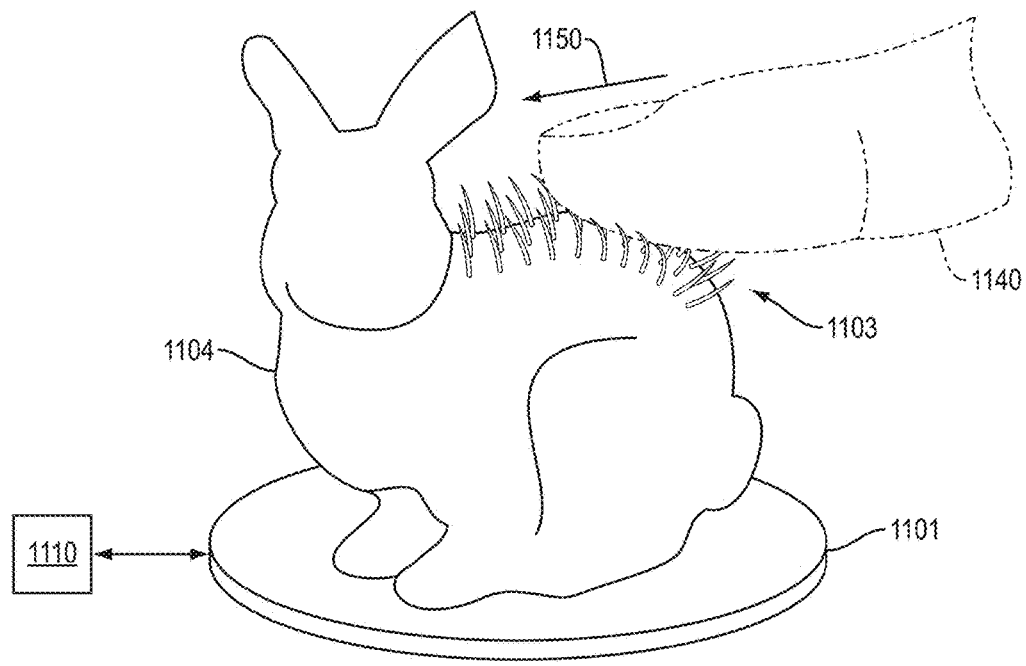
FIG. 13A and FIG. 13B show a sensor that detects vibrations imparted by a user's finger stroking micro-pillars on a toy animal.
Figure 13B:
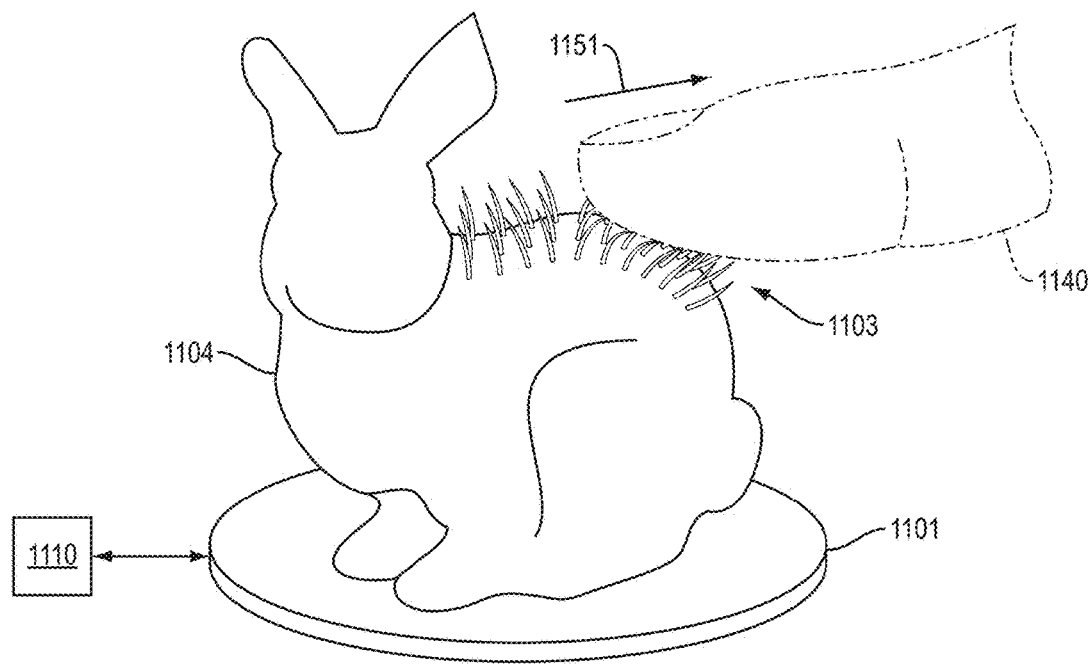

FIGS. 13A and 13B show a sensor that detects vibrations imparted by a user's finger stroking micro-pillars on a toy animal, in an illustrative implementation of this invention. In FIGS. 13A and 13B, a micro-pillar array 1103 is attached to a toy animal 1104. The toy animal 1104 is attached to a microphone 1001. The sensor 1001 detects vibrations caused by a user's finger 1140. In FIG. 11A, the finger 1140 is moving in a first direction 1150. In FIG. 11B, the finger 1140 is moving in a second direction 1151. Swipes in the first and second directions produce different vibration patterns.

Figure 14:
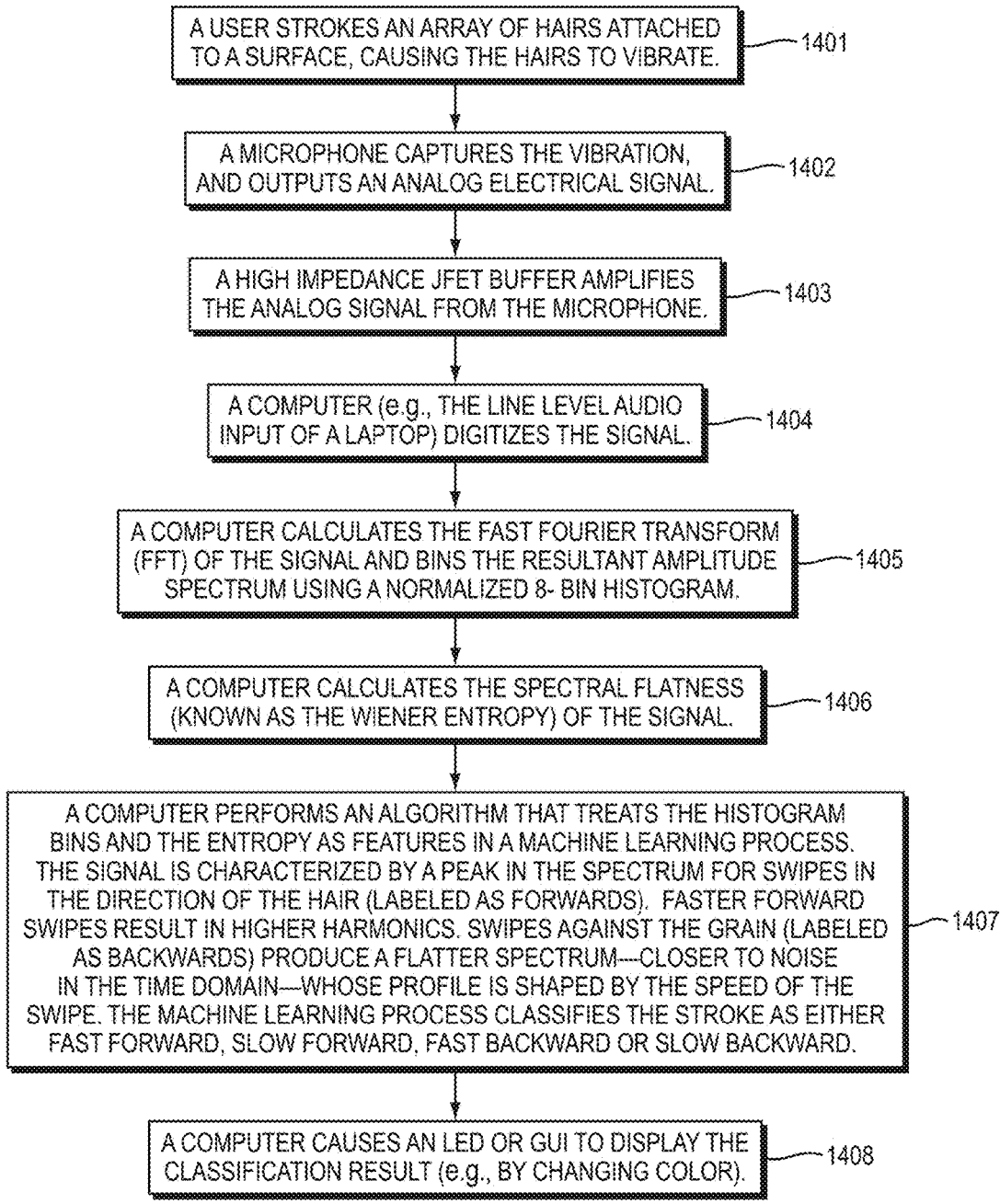
FIG. 14 is a flowchart of a method of sensing acoustic vibrations of micro-pillars.

FIG. 14 is a flowchart of a method of sensing vibrations of micro-pillars, in an illustrative implementation of this invention. The method includes the following steps: A user strokes an array of micro-pillars attached to a surface, causing the micro-pillars to vibrate (Step 1401). A microphone captures the vibration, and outputs an analog electrical signal (Step 1402). A high impedance JFET buffer amplifies the analog signal from the microphone (Step 1403). A computer (e.g., the line level audio input of a laptop) digitizes the signal (Step 1404). A computer calculates the fast Fourier Transform (FFT) of the signal and bins the resultant amplitude spectrum using a normalized 8-bin histogram (Step 1405). A computer calculates the spectral flatness (known as the Wiener entropy) of the signal (Step 1406). A computer performs an algorithm that treats the histogram bins and the entropy as features in a machine learning process. The signal is characterized by a peak in the spectrum for swipes in the direction of the micro-pillar (labeled as forwards). Faster forward swipes result in higher harmonics. Swipes against the grain (labeled as backwards) produce a flatter spectrum—closer to noise in the time domain—whose profile is shaped by the speed of the swipe. The machine learning process classifies the stroke as either fast forward, slow forward, fast backward or slow backward (Step 1407). A computer causes an LED or GUI to display the classification result (e.g., by changing color) (Step 1408).

In some implementations of this invention, analog circuits perform real time frequency filtering to recognize gestures without a machine learning process.

A wide variety of machine learning algorithms may be employed for classifying vibrations due to different swipes.

For example, in illustrative implementations, the algorithm may use a support vector machines or artificial neural networks.

In illustrative implementations of this invention, a wide variety of microphones may be employed to measure sound vibrations. For example, in FIGS. 11A, 11B, 13A and 13B, the microphone (1101, 1141) may comprise a: (a) condenser microphone, capacitor microphone, electrostatic microphone, RF condenser microphone, or electret condenser microphone; (b) a dynamic microphone or magneto-dynamic microphone; (c) ribbon microphone; (d) piezoelectric microphone; (e) fiber optic microphone; (f) laser microphone; or (g) MEMS (microelectrical-mechanical) microphone. In some implementations, the microphone (e.g., 1101, 1141) measures vibrations in the human audible range. In other implementations, the microphone (e.g., 1101, 1141) measures vibrations that are at frequencies that are not audible to a human ear.

Computers

In illustrative implementations of this invention, one or more electronic computers (e.g., 130, 133, 134, 911, 930, 1130) are programmed and specially adapted: (1) to control the operation of, or interface with, hardware components of a 3D printer, including to control 3D printing of micro-pillars including to control height, thickness, tilt and profile of 3D printed individual micro-pillars and to control 3D printing an array of micro-pillars on a flat or curved surface; (2) to generate instructions for 3D printing of micro-pillars, micro-pillar arrays and other objects; (3) to control the operation of, or interface with, a vibration actuator that causes vibration of micro-pillars, including to control the frequency and amplitude of the vibration; (4) to control the operation of, or interface with, a sensor that takes measurements of sounds caused by swipes against a micro-pillar array, and to perform a machine learning algorithm that, based on the measurements, classifies the swipes; (5) to receive signals indicative of human input; (6) to output signals for controlling transducers for outputting information in human perceivable format; and (7) to process data, to perform computations, to execute any algorithm or software, and to control the read or write of data to and from memory devices (items 1-7 of this sentence referred to herein as the "Computer Tasks"). The one or more computers communicate with each other or with other devices in a system either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, an electronic device (e.g., 110, 130, 133, 134, 911, 930, 1130) is configured for wireless or wired communication with other electronic devices in a network.

For example, in some cases, a computer (e.g., 130, 133, 134, 911, 930, 1130) includes a wireless communication module for wireless communication with other electronic devices in a network. Each wireless communication module includes (a) one or more antennas, (b) one or more wireless transceivers, transmitters or receivers, and (c) signal processing circuitry. The wireless communication module receives and transmits data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 130, 133, 134, 911, 930, 1130) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard, or other IEEE communication standard.

I/O Devices

In illustrative implementations, a computer (e.g., 130, 133, 134, 911, 930, 1130) includes, or interfaces with, I/O devices. For example, in some cases, the I/O devices comprise one or more of the following: touch screens, cameras, microphones, speakers, accelerometers, gyroscopes, magnetometers, inertial measurement units, pressure sensors, touch sensors, capacitive sensors, buttons, dials, sliders, transducers (e.g., haptic transducers), graphical user interfaces, electronic display screens, and projectors.

In illustrative implementations, a human inputs data or instructions via one or more I/O devices.

DEFINITIONS

The terms "a" and "an", when modifying a noun, do not imply that only one of the noun exists.

To say that fabrication is "in accordance with" instructions means that signals, which encode or are derived from the instructions, control hardware that performs the process. To say that a process is "in accordance with" instructions does not mean that actual performance must exactly match specifications in the instructions. For example, hardware operating within tolerances may perform in a manner that does not exactly match the specifications.

"Array of micro-pillars" or "micro-pillar array" means a set of at least one thousand micro-pillars. Neither the term "array of micro-pillars" nor the term "micro-pillar array" implies a particular spatial arrangement of the micro-pillars relative to each other. For example, the micro-pillars in an "array of micro-pillars" do not need to be positioned in a rectangular grid.

As used herein, the "aspect ratio" of a structure means the ratio of the length of the structure to the width of the structure. For purposes of the preceding sentence: (a) "length" is the maximum distance between two points on the exterior surface of the structure; (b) "longitudinal axis" means the line segment along which length is measured; and (c) width is the maximum distance, measured along a line perpendicular to the longitudinal axis, between two points on the exterior surface of the structure. For purposes of the preceding sentence, the longitudinal axis or the perpendicular line may be positioned in whole or in part outside of the interior of the structure.

To say that a given aspect ratio is greater than X:1 means that the given aspect ratio is equal to Y:1, where Y is greater than X. For example, 3:1 is greater than 2:1.

To "attach" an array of micro-pillars to a flat surface means that the bases of the micro-pillars in the array all lie in the same geometric plane. To "attach" an array of micro-pillars to a curved surface means that the bases of the micro-pillars in the array all lie in a geometric curved surface.

To compute "based on" specified data means to perform a computation that takes the specified data as an input.

"Base" of a micro-pillar means an end layer of the micro-pillar, which end layer has a thickness that is greater than the thickness of any other end layer.

"Base thickness" of a micro-pillar means the thickness of the base of the micro-pillar.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

The term "e.g." means for example.

"End layer" means a layer of a micro-pillar such that no portion of the layer is positioned between two other layers of the micro-pillar when the micro-pillar is fully fabricated.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say that a computer "generates" a digital model means that the computer performs an algorithm that outputs the digital model.

"Height" of a micro-pillar means the vertical height of the micro-pillar.

"Herein" means in this document, including text, specification, claims, abstract, and drawings.

In the context of an array of micro-pillars attached to a flat surface, "horizontal" means in a geometric plane that is parallel to the flat surface. In the context of an array of micro-pillars attached to a curved surface, the "horizontal" direction may vary throughout the array, and is locally defined for each respective micro-pillar in the array as follows: For each respective micro-pillar in the array, "horizontal" means perpendicular to the surface normal for the respective micro-pillar.

As used herein, the "horizontal vector" of a movement means the position vector that is the sum of the horizontal components of the movement. For example, if the sum of the horizontal components of a translation is the position vector <6,0,0>, then the "horizontal vector" of the translation is the vector <6,0,0>.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

The term "or" is inclusive, not exclusive. For example, A or B is true if A is true, or B is true, or both A or B are true. Also, for example, a calculation of A or B means a calculation of A, or a calculation of B, or a calculation of A and B.

"Micro-pillar" means a physical structure that has (a) a length that is greater than 100 micrometers and less than 50 millimeters; (b) a width that is greater than 50 micrometers and less than 1 millimeter; and (c) an aspect ratio that is greater than 2:1. For purposes of the preceding sentence: (a) "length" is the maximum distance between two points on the exterior surface of the structure; (b) "longitudinal axis" means the line segment along which length is measured; and (c) width is the maximum distance, measured along a line perpendicular to the longitudinal axis, between two points on the exterior surface of the structure. For purposes of the preceding sentence, the longitudinal axis or the perpendicular line may be positioned in whole or in part outside of the interior of the structure.

As used herein, "parameter" means a variable. For example: (a) if y=f(x), then both x and y are parameters; and (b) if z=f(x(t), y(t)), then t, x, y and z are parameters. A parameter may represent a physical quantity, such as height.

A parenthesis is simply to make text easier to read, by indicating a grouping of words. A parenthesis does not mean that the parenthetical material is optional or may be ignored.

As used herein: (a) a "pixel" of a digital model means a pixel or voxel of the digital model; and (b) a "pixel" of a physical object that is fabricated in accordance with a digital model means a region of the physical object that corresponds to a pixel or voxel of the digital model.

"Position vector", in a given coordinate system, means a vector that starts at the origin of the given coordinate system.

"Profile" of a micro-pillar means (i) speed of tapering of the micro-pillar, or (ii) acceleration of tapering of the micro-pillar. For purposes of this paragraph: (a) speed of tapering means the rate of change, per layer, in the number of pixels in respective layers of the micro-pillar; and (b) acceleration means the rate of change of the speed of tapering. For example, if, over a region of nine layers of the micro-pillar, the thickness of the micro-pillar reduces, from the bottom of the region to the top of the region, at a constant rate of one pixel per layer, such that the bottom layer consists of 9 pixels and the top layer consists of 1 pixel, then (a) speed of tapering in that region is 1 pixel per layer; and (b) the acceleration of tapering in that region is zero.

As used herein, the term "set" means a group that consists of a finite number of elements, which finite number is greater than or equal to two.

"Some" means one or more.

The term "sound" is not limited to the human audible range.

To say that the "speed" of an object is greater during A than during B means that (a) the object achieves a first speed, which is the maximum speed of the object during A, (b) the object achieves a second speed, which is the maximum speed of the object during B, and (c) the first speed is greater than the second speed.

As used herein, a "subset" of a set consists of less than all of the elements of the set.

To say that the position of A relative to B is "substantially constant" during a period means that there exists a 3D Cartesian coordinate system, such that (a) the coordinate system has its origin at A, and (b) each of the three Cartesian coordinates, respectively, of B does not vary by more than 5 percent throughout the entire period.

To say that the horizontal vector of a movement is in "substantially the same direction" as the tilt of a micro-pillar means that the angle between the tilt and the horizontal vector of the movement is less than 5 degrees.

The "sum" of horizontal components means a vector that is the sum of the horizontal components.

"Surface normal", in the context of a micro-pillar attached to a surface, means a line that (a) intersects the base of the micro-pillar, and (b) is perpendicular to the geometric plane that is tangent, at the base of the micro-pillar, to the surface.

The term "such as" means for example.

"3D" means three-dimensional.

"3D printer" means a device for fabricating a 3D object by additive manufacturing. Non-limiting examples of a 3D printer include: (a) a photopolymerization 3D printer (e.g., a Digital Light Processing® printer or a stereolithography printer); (b) an inkjet head 3D printer; (c) a direct metal laser sintering 3D printer, electron-beam melting 3D printer, selective laser melting 3D printer, or selective heat sintering 3D printer; (d) a fused deposition modeling 3D printer; (e) an electron beam freeform fabrication 3D printer; or (f) a laminated object manufacturing 3D printer.

"Thickness" of a layer means the maximum distance between two points in the exterior surface of the layer.

"Tilt" of a micro-pillar means the sum of the horizontal components of a position vector, which position vector starts at the base of the micro-pillar and ends at the tip of the micro-pillar.

"Tip" means an end layer of a micro-pillar, which end layer is not the base of the micro-pillar.

"Translation" means movement from a first point to a different, second point.

To say that a machine-readable medium is "transitory" means that the medium is a transitory signal, such as an electromagnetic wave.

A "vertical" direction means a direction that is perpendicular to a horizontal plane.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In some implementations, this invention is a method comprising: (a) a computer (i) generating a digital model of an array of micro-pillars, which digital model specifies, for each respective micro-pillar in the array or in a portion of the array, values of at least two parameters out of a set of parameters, which set consists of height of the respective micro-pillar, tilt of the respective micro-pillar, base thickness of the respective micro-pillar, and profile of the respective micro-pillar, and (ii) outputting instructions for fabrication of the array in accordance with the digital model; and (b) a 3D printer fabricating the array in accordance with the instructions. In some cases, the digital model specifies, for each respective micro-pillar in the array, a height and a tilt of the respective micro-pillar. In some cases: (a) the digital model specifies, for each respective micro-pillar in the array, the tilt of the respective micro-pillar by specifying a first Cartesian coordinate and a second Cartesian coordinate; (b) the first Cartesian coordinate specifies a first horizontal component of the tilt of the respective micro-pillar; and (c) the second Cartesian coordinate specifies a second horizontal component of the tilt of the respective micro-pillar. In some cases, the digital model comprises a RGB bitmap that assigns an R value, a G value and a B value to each respective micro-pillar in the array, such that: (a) the R, G and B values do not represent color information; (b) a first value, out of the R, G and B values for the respective micro-pillar, specifies the first Cartesian coordinate; (c) a second value, out of the R, G and B values for the respective micro-pillar, specifies the second Cartesian coordinate; and (d) a third value, out of the R, G and B values for the respective micro-pillar, specifies the height of the respective micro-pillar. In some cases, the number of micro-pillars per unit area of the array that is fabricated depends on the number of times, per unit area of the array, that the computer samples the bitmap. In some cases, the fabricating includes attaching the micro-pillars to a flat surface. In some cases, the fabricating includes attaching the micro-pillars to a curved surface. Each of the cases described above in this paragraph is an example of the method described in the first sentence of this paragraph, and is also an example of an embodiment of this invention that may be combined with other embodiments of this invention.

In some implementations, this invention is a system comprising: (a) a computer that is programmed (i) to generate a digital model of an array of micro-pillars, which digital model specifies, for each respective micro-pillar in the array or in a portion of the array, values of at least two parameters out of a set of parameters, which set consists of height of the respective micro-pillar, tilt of the respective micro-pillar, base thickness of the respective micro-pillar, and profile of the respective micro-pillar, and (ii) to output instructions for fabrication of the array in accordance with the digital model; and (b) a 3D printer configured to fabricate the array in accordance with the instructions. In some cases, the digital model specifies, for each respective micro-pillar in the array, a height and a tilt of the respective micro-pillar. In some cases: (a) the digital model specifies, for each respective micro-pillar in the array, the tilt of the respective micro-pillar by specifying a first Cartesian coordinate and a second Cartesian coordinate; (b) the first Cartesian coordinate specifies a first horizontal component of the tilt of the respective micro-pillar; and (c) the second Cartesian coordinate specifies a second horizontal component of the tilt of the respective micro-pillar. In some cases, the digital model comprises a RGB bitmap that assigns an R value, a G value and a B value to each respective micro-pillar in the array, such that: (a) the R, G and B values do not represent color information; (b) a first value, out of the R, G and B values for the respective micro-pillar, specifies the first Cartesian coordinate; (c) a second value, out of the R, G and B values for the respective micro-pillar, specifies the second Cartesian coordinate; and (d) a third value, out of the R, G and B values for the respective micro-pillar, specifies height of the respective micro-pillar. In some cases, the number of micro-pillars per unit area of the array that is fabricated depends on the number of times, per unit area of the array, that the computer samples the bitmap. In some cases, the fabricating includes attaching the micro-pillars to a flat surface. In some cases, the fabricating includes attaching the micro-pillars to a curved surface. Each of the cases described above in this paragraph is an example of the system described in the first sentence of this paragraph, and is also an example of an embodiment of this invention that may be combined with other embodiments of this invention.

In some implementations, this invention is a system comprising: (a) a first array of micro-pillars; and (b) a motor for producing vibrations, such that the vibrations are transferred to the first array and cause a first object that is touching the first array to undergo a translation relative to the first array. In some cases, the position of the motor relative to the first array is substantially constant during the translation. In some cases: (a) the first array is attached to a flat surface; and (b) the horizontal vector of the translation is in substantially the same direction as the tilt of micro-pillars touching the object during the translation. In some cases: (a) the system further comprises a second array of micro-pillars; (b) the first array is attached to a flat surface and the second array is also attached to the flat surface; (c) the first and second arrays are positioned such that (i) micro-pillars in the first array are tilted in a first direction, and (ii) micro-pillars in the second array are tilted in a second direction, the first and second directions not being parallel to each other; (d) a first resonant frequency is the resonant frequency of micro-pillars in the first array and a second resonant frequency is the resonant frequency of micro-pillars in the second array; (e) the first and second resonant frequencies are different from each other; (f) the motor is configured to produce, at some times, vibrations that have maximum amplitude at the first resonant frequency and that actuate a first movement of an object touching the first and second arrays; (g) the motor is configured to produce, at other times, vibrations that have maximum amplitude at the second resonant frequency and that actuate a second movement of the object touching the first and second arrays; (h) the horizontal vector of the first movement is in substantially the same direction as the tilt of micro-pillars in the first array; and (i) the horizontal vector of the second movement is in substantially the same direction as the tilt of micro-pillars in the second array. In some cases: (a) the system further comprises a second array of micro-pillars; (b) a first resonant frequency is the resonant frequency of micro-pillars in the first array and a second resonant frequency is the resonant frequency of micro-pillars in the second array; (c) the first and second resonant frequencies are different from each other; and (d) the motor is configured to produce, at some times, a first set of vibrations that have maximum amplitude at the first resonant frequency, and to produce, at other times, a second set of vibrations that have maximum amplitude at the second resonant frequency, such that (i) the first set of vibrations actuate movement of a first object that is touching the first and second arrays, (ii) the second set of vibrations actuate movement of a second object that is touching the first and second arrays, the mass of the first object being different than the mass of the second object, (iii) speed of the first object, relative to the first array, is greater during the first set of vibrations than during the second set of vibrations, and (iv) speed of the second object, relative to the second array, is greater during the second set of vibrations than during the first set of vibrations. Each of the cases described above in this paragraph is an example of the system described in the first sentence of this paragraph, and is also an example of an embodiment of this invention that may be combined with other embodiments of this invention.

In some implementations, this invention is a system comprising: (a) an array of micro-pillars configured to undergo vibrations when an external object moves in a trajectory across the array while touching the array, (b) a sensor for taking measurements of the vibrations; and (c) a computer; wherein (i) the vibrations have a spectrum that depends, at any given point in the trajectory, on the orientation of the trajectory at the given point relative to the orientation of micro-pillars in the array, and (ii) the computer is programmed to perform a calculation that (A) takes data indicative of the measurements as an input, and (B)

performs machine learning to classify the trajectory based on the spectrum. The preceding sentence describes an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. A method comprising:
   (a) generating a digital model of an array of micro-pillars, in such a way that the digital model describes each respective micro-pillar in the array by only three parameters, which three parameters are members of a set of parameters, which set consists of (i) height of the respective micro-pillar, (ii) a first horizontal component of a vector of the respective micro-pillar, which vector starts at a base of the respective micro-pillar and ends at a tip of the respective micro-pillar, (iii) a second horizontal component of the vector of the respective micro-pillar, (iv) base thickness of the respective micro-pillar, (v) speed of tapering of the respective micro-pillar, and (vi) acceleration of tapering of the respective micro-pillar;
   (b) outputting instructions for fabrication of the array in accordance with the digital model; and
   (c) fabricating, with a 3D printer, the array in accordance with the instructions.

2. The method of claim 1, wherein the digital model specifies, for each respective micro-pillar in the array (a) the height of the respective micro-pillar, (b) the first horizontal component of the vector of the respective micro-pillar, and (c) the second horizontal component of the vector of the respective micro-pillar.

3. The method of claim 2, wherein:
   (a) the digital model specifies, for each respective micro-pillar in the array, a first Cartesian coordinate and a second Cartesian coordinate;
   (b) the first Cartesian coordinate specifies the first horizontal component of the vector of the respective micro-pillar; and
   (c) the second Cartesian coordinate specifies the second horizontal component of the vector of the respective micro-pillar.

4. The method of claim 3, wherein the digital model comprises a RGB bitmap that assigns an R value, a G value and a B value to each respective micro-pillar in the array, such that:
   (a) the R, G and B values do not represent color information;
   (b) a first value, out of the R, G and B values for the respective micro-pillar, specifies the first Cartesian coordinate;
   (c) a second value, out of the R, G and B values for the respective micro-pillar, specifies the second Cartesian coordinate; and
   (d) a third value, out of the R, G and B values for the respective micro-pillar, specifies the height of the respective micro-pillar.

5. The method of claim 4, wherein the number of micro-pillars per unit area of the array that is fabricated depends on the number of times, per unit area of the array, that the computer samples the bitmap.

6. The method of claim 1, wherein the fabricating includes attaching the micro-pillars to a flat surface.

7. The method of claim 1, wherein the fabricating includes attaching the micro-pillars to a curved surface.

8. The method of claim 1, wherein no pair of micro-pillars, in the array of micro-pillars, is positioned in such a way that one micro-pillar in the pair starts at the same point where the other micro-pillar in the pair ends.

9. A system comprising:
   (a) a computer that is programmed
      (i) to generate a digital model of an array of micro-pillars, in such a way that the digital model describes each respective micro-pillar in the array by only three parameters, which three parameters are members of a set of parameters, which set consists of (i) height of the respective micro-pillar, (ii) a first horizontal component of a vector of the respective micro-pillar, which vector starts at a base of the respective micro-pillar and ends at a tip of the respective micro-pillar, (iii) a second horizontal component of the vector of the respective micro-pillar, (iv) base thickness of the respective micro-pillar, (v) speed of tapering of the respective micro-pillar, and (vi) acceleration of tapering of the respective micro-pillar, and
      (ii) to output instructions for fabrication of the array in accordance with the digital model; and
   (b) a 3D printer configured to fabricate the array in accordance with the instructions.

10. The system of claim 9, wherein the digital model specifies, for each respective micro-pillar in the array (a) the height of the respective micro-pillar, (b) the first horizontal component of the vector of the respective micro-pillar, and (c) the second horizontal component of the vector of the respective micro-pillar.

11. The system of claim 9, wherein:
   (a) the digital model specifies, for each respective micro-pillar in the array, a first Cartesian coordinate and a second Cartesian coordinate;
   (b) the first Cartesian coordinate specifies the first horizontal component of the vector of the respective micro-pillar; and
   (c) the second Cartesian coordinate specifies the second horizontal component of the vector of the respective micro-pillar.

12. The system of claim 9, wherein the digital model comprises a RGB bitmap that assigns an R value, a G value and a B value to each respective micro-pillar in the array, such that:
   (a) the R, G and B values do not represent color information;
   (b) a first value, out of the R, G and B values for the respective micro-pillar, specifies a first Cartesian coordinate;
   (c) a second value, out of the R, G and B values for the respective micro-pillar, specifies a second Cartesian coordinate; and
   (d) a third value, out of the R, G and B values for the respective micro-pillar, specifies the height of the respective micro-pillar.

13. The system of claim 12, wherein the number of micro-pillars per unit area of the array that is fabricated depends on the number of times, per unit area of the array, that the computer samples the bitmap.

14. The system of claim 9, wherein the fabricating includes attaching the micro-pillars to a flat surface.

15. The system of claim 9, wherein the fabricating includes attaching the micro-pillars to a curved surface.

16. The system of claim 9, wherein no pair of micro-pillars, in the array of micro-pillars, is positioned in such a way that one micro-pillar in the pair starts at the same point where the other micro-pillar in the pair ends.

* * * * *